(12) United States Patent
Hayashi et al.

(10) Patent No.: US 6,803,104 B2
(45) Date of Patent: Oct. 12, 2004

(54) MAGNETIC RECORDING MEDIUM, NON-MAGNETIC ACICULAR BLACK IRON-BASED COMPOSITE PARTICLES AND PROCESS FOR PRODUCING THE PARTICLES

(75) Inventors: Kazuyuki Hayashi, Hiroshima (JP); Keisuke Iwasaki, Hiroshima (JP); Yasuyuki Tanaka, Onoda (JP); Hiroko Morii, Hiroshima (JP)

(73) Assignee: Toda Kogyo Corporation, Hiroshima-ken (JP)

(*) Notice: Subject to any disclaimer, the term of this patent is extended or adjusted under 35 U.S.C. 154(b) by 0 days.

(21) Appl. No.: 10/055,809

(22) Filed: Jan. 28, 2002

(65) Prior Publication Data

US 2002/0114976 A1 Aug. 22, 2002

Related U.S. Application Data

(63) Continuation-in-part of application No. 09/632,096, filed on Aug. 2, 2000, now Pat. No. 6,352,776, which is a continuation-in-part of application No. 09/523,646, filed on Mar. 10, 2000, now Pat. No. 6,287,668, which is a continuation-in-part of application No. 09/208,771, filed on Dec. 10, 1998, now abandoned.

(30) Foreign Application Priority Data

| Dec. 12, 1997 | (JP) | ............................................ 9-362701 |
| Dec. 11, 1998 | (EP) | ............................................ 98310175 |
| Aug. 3, 1999 | (JP) | ......................................... 11-220181 |
| Apr. 28, 2000 | (JP) | ...................................... 2000-131866 |
| Aug. 2, 2000 | (EP) | ........................................... 00306559 |

(51) Int. Cl.$^7$ ............................................... G11B 5/738
(52) U.S. Cl. ....................... 428/403; 428/404; 428/405; 428/407; 428/694 BS; 428/694 BN
(58) Field of Search ................................. 428/403, 404, 428/405, 407, 694 BS, 694 BN, 900

(56) References Cited

U.S. PATENT DOCUMENTS 5,750,250 A * 5/1998 Hayashi et al. ............. 428/328

FOREIGN PATENT DOCUMENTS

EP 0 913 431 A2 * 5/1999

* cited by examiner

Primary Examiner—Stevan A. Resan
(74) Attorney, Agent, or Firm—Nixon & Vanderhye P.C.

(57) ABSTRACT

A magnetic recording medium composed of a non-magnetic base film; a non-magnetic undercoat layer formed on the non-magnetic base film, including a binder resin and non-magnetic acicular black iron-based composite particles; and a magnetic coating film comprising a binder resin and magnetic particles. The non-magnetic acicular black iron-based composite particles having an average major axis diameter of about 0.011 to 0.35 µm, and are composed of acicular hematite particles or acicular iron oxide hydroxide particles (as core particles) having an average major axis diameter of 0.01 to 0.3 µm; a coating layer formed on the surface of the core particles of a specific organosilicon compound; and a single carbon black coat formed on the coating layer in an amount of 21 to 50 parts by weight based on 100 parts by weight of the core particles.

21 Claims, No Drawings

MAGNETIC RECORDING MEDIUM, NON-MAGNETIC ACICULAR BLACK IRON-BASED COMPOSITE PARTICLES AND PROCESS FOR PRODUCING THE PARTICLES

CROSS REFERENCE TO RELATED APPLICATION

This is a continuation-in-part of application, Ser. No. 09/632,096 filed Aug. 2, 2000, now U.S. Pat. No. 6,352,776, which is a continuation-in-part of application, Ser. No. 09/523,646 filed Mar. 10, 2000, now U.S. Pat. No. 6,287,688, which is a continuation-in-part of application, Ser. No. 09/208,771 filed Dec. 10, 1998 now abandoned.

BACKGROUND OF THE INVENTION

The present invention relates to a magnetic recording medium, non-magnetic acicular black iron-based composite particles and a process for producing the non-magnetic acicular black iron-based composite particles, and more particularly, to a magnetic recording medium having a smooth surface, a lower light transmittance, a lower surface resistively value, a low friction coefficient and an excellent running durability; non-magnetic acicular black iron-based composite particles having an excellent dispersibility in vehicle due to less amount of carbon black desorbed or fallen-off from the surfaces thereof, a more excellent blackness, a lower volume resistivity value and a well-controlled myristic acid absorption; a process for producing the non-magnetic acicular black iron-based composite particles; and a non-magnetic substrate for magnetic recording media having a smooth surface and a lower surface resistivity value.

With a development of miniaturized and lightweight video or audio magnetic recording and reproducing apparatuses for long-time recording, magnetic recording media such as a magnetic tape and magnetic disk have been increasingly and strongly required to have a higher performance, namely, a higher recording density, higher output characteristic, in particular, an improved frequency characteristic and a lower noise level.

Video tapes have recently been required more and more to have a higher picture quality, and the frequencies of carrier signals recorded in recent video tapes are higher than those recorded in conventional video tapes. In other words, the signals in the short-wave region have come to be used, and as a result, the magnetization depth from the surface of a magnetic tape has come to be remarkably small.

With respect to short wavelength signals, a reduction in the thickness of a magnetic recording layer is also strongly demanded in order to improve the high output characteristics, especially, the S/N ratio of a magnetic recording medium. This fact is described, for example, on page 312 of Development of Magnetic Materials and Technique for High Dispersion of Magnetic Powder, published by Sogo Gijutsu Center Co., Ltd. (1982), " . . . the conditions for high-density recording in a coated-layer type tape are that the noise level is low with respect to signals having a short wavelength and that the high output characteristics are maintained. To satisfy these conditions, it is necessary that the tape has large coercive force Hc and residual magnetization Br, . . . and the coating film has a smaller thickness, . . . ".

Development of a thinner film for a magnetic recording layer has caused some problems.

Firstly, it is necessary to make a magnetic recording layer smooth and to eliminate the non-uniformity of thickness. As well known, in order to obtain a smooth magnetic recording layer having a uniform thickness, the surface of the base film must also be smooth. This fact is described on pages 180 and 181 of *Materials for Synthetic Technology—Causes of Friction and Abrasion of Magnetic Tape and Head Running System and Measures for Solving the Problem* (hereinunder referred to as "*Materials for Synthetic Technology*" (1987), published by the Publishing Department of Technology Information Center, " . . . the surface roughness of a hardened magnetic coating film depends on the surface roughness of the base film (back surface roughness) so largely as to be approximately proportional, . . . , since the magnetic coating film is formed on the base film, the more smooth the surface of the base film is, the more uniform and larger head output is obtained and the more the S/N ratio is improved."

Secondly, there has been caused a problem in the strength of a base film with a tendency of the reduction in the thickness of the base film in response to the demand for a thinner magnetic coating film. This fact is described, for example, on page 77 of the above-described *Development of Magnetic Materials and Technique for High Dispersion of Magnetic Powder*, " . . . Higher recording density is a large problem assigned t the present magnetic tape. This is important in order to shorten the length of the tape so as to miniaturize the size of a cassette and to enable long-time recording. For this purpose, it is necessary to reduce the thickness of a base film . . . With the tendency of reduction in the film thickness, the stiffness of the tape also reduces to such an extent as to make smooth travel in a recorder difficult. Therefore, improvement of the stiffness of a video tape both in the machine direction and in the transverse direction is now strongly demanded. . . . "

The end portion of a magnetic recording medium such as a magnetic tape, especially, a video tape is judged by detecting a portion of the magnetic recording medium at which the light transmittance is large by a video deck. If the light transmittance of the whole part of a magnetic recording layer is made large by the production of a thinner magnetic recording medium or the ultrafine magnetic particles dispersed in the magnetic recording layer, it is difficult to detect the portion having a large light transmittance by a video deck. For reducing the light transmittance of the whole part of a magnetic recording layer, carbon black fine particles or the like is added to the magnetic recording layer. It is, therefore, essential to add carbon black or the like to a magnetic recording layer in the present video tapes.

However, addition of a large amount of non-magnetic particles such as carbon black fine particles impairs not only the enhancement of the magnetic recording density but also the development of a thinner recording layer. In order to reduce the magnetization depth from the surface of the magnetic tape and to produce a thinner magnetic recording layer, it is strongly demanded to reduce, as much as possible, the quantity of non-magnetic particles such as carbon black fine particles which are added to a magnetic recording layer.

Consequently, it has been strongly demanded to provide a magnetic recording medium capable of exhibiting a low light transmittance even when the amount of carbon black fine particles added to a magnetic recording layer thereof is reduced as low as possible. From this viewpoint, it has been strongly required to essentially improve properties of a substrate therefor.

Further, in order to reduce not only the above-mentioned light transmittance of the magnetic recording medium but also an electric resistance thereof, there has been hitherto proposed a method of adding carbon black fine particles to the magnetic recording layer.

The conventional magnetic recording medium to which carbon black fine particles are added, is described in detail below.

When a magnetic recording medium has a high surface resistivity, an electrostatic charge thereon tends to be increased, so that cut chips of the magnetic recording medium and dirt or dusts are attached onto the surface of the magnetic recording medium upon production or use thereof, and as a result, such a problem that the number of "drop-out" becomes increased, is caused.

In order to decrease the surface resistivity of the magnetic recording medium to about $10^8$ $\Omega/cm^2$, a conductive compound such as carbon black fine particles has been ordinarily added to the magnetic recording layer in an amount of not less than about 5 parts by weight based on 100 parts of magnetic particles contained in the magnetic recording layer.

However, when the amount of carbon black fine particles added or the like which cannot contribute to improvement in magnetic properties of the magnetic recording layer, is increased, the magnetic recording medium has been deteriorated in electromagnetic performance as described above, resulting in inhibiting the magnetic recording layer from being thinned.

It has been required to further enhance the performance of magnetic recording media. The magnetic recording media have been strongly required to exhibit not only high-density recording property but also improved physical properties such as running property.

A good running property of the magnetic recording media can be usually assured by adding to a magnetic recording layer ordinarily formed as an upper layer of the magnetic recording medium, a fatty acid such as myristic acid and stearic acid (hereinafter referred to merely as "myristic acid") in an amount of usually about 0.5 to about 5% by weight based on the weight of magnetic particles used in the magnetic recording layer. The thus added myristic acid is controlled so as to be gradually oozed from the magnetic recording layer, thereby rendering the surface thereof more slippery.

When the amount of the myristic acid oozed onto the surface of the magnetic recording layer is too small, it is difficult to impart a good running property to the magnetic recording media. On the contrary, when a large amount of the myristic acid is added to the magnetic recording layer in order to increase the amount of the myristic acid oozed onto the surface thereof, the myristic acid is preferentially absorbed onto the surfaces of magnetic particles dispersed in the magnetic recording layer, thereby inhibiting resins from being absorbed onto the surfaces of the magnetic particles. As a result, it becomes difficult to disperse the magnetic particles in vehicle. Also, the increased content of the myristic acid as a non-magnetic component tends to cause deterioration in magnetic properties of the obtained magnetic recording media. Further, since the myristic acid acts as a plasticizer, there arise problems such as deteriorated strength of the magnetic recording media.

With the recent tendency toward reduction in thickness of the magnetic recording layer, an absolute amount of myristic acid being addable thereto is decreased. Also, in order to achieve high-density recording on magnetic recording media, it has been required that magnetic particles used therein are much finer, resulting in increase in BET specific surface area thereof. The increment in BET specific surface area of the magnetic particles increases an amount of the myristic acid absorbed onto the surfaces thereof. As a result, it becomes more and more difficult to assure a good running property of the magnetic recording layer, by controlling the amount of the myristic acid oozed onto the surface of the magnetic recording layer only by a amount of myristic acid added to the magnetic recording layer.

In Japanese Patent Application Laid-Open (KOKAI) No. 5-182178 (1993), it is described that "in the present invention . . . , inorganic particles and fatty acid contained in the non-magnetic layer are prevented from being interacting with each other to control respective contents of the fatty acid in the non-magnetic layer and the magnetic recording layer, thereby improving a running durability of the magnetic recording layer . . . ". As understood from the above description, it has been strongly required to assure a good running property of magnetic recording media by appropriately controlling the amount of myristic acid oozed onto the surface of the magnetic recording layer, by means of both the magnetic recording layer and the non-magnetic undercoat layer having a thickness two or more times that of the magnetic recording layer.

With the reduction in thickness of the magnetic recording layer or the base film therefor, various attempts have been conducted in order to improve properties of a substrate on which the magnetic recording layer is formed, thereby enhancing a surface smoothness and a strength of the magnetic recording medium. In this regard, there has been proposed a method of forming on a base film, at least one undercoat layer composed of a binder resin and non-magnetic particles dispersed in the binder resin and containing iron as a main component, such as acicular hematite particles or acicular iron oxide hydroxide particles (hereinafter referred to merely as "non-magnetic undercoat layer"), and such a method has been already put into practice (Japanese Patent Publication (KOKOKU) No. 6-93297 (1994), Japanese Patent Application Laid-open (KOKAI) Nos. 62-159338(1987), 63-187418(1988), 4-167225(1992), 4-325915(1992), 5-73882(1993), 5-182177(1993), 5-347017(1993) and 6-60362(1994), and the like).

It is known to use as the non-magnetic particles for non-magnetic undercoat layer, non-magnetic particles which surfaces are coated with hydroxides of aluminum, oxides of aluminum, hydroxides of silicon, oxides of silicon or a mixture thereof in order to improve the dispersibility thereof in vehicles, thereby enhancing a surface smoothness and a strength of the obtained non-magnetic substrate (Japanese Patent Nos. 2,571,350 and 2,582,051, and Japanese Patent Application Laid-open (KOKAI) Nos. 6-60362(1994), 9-22524(1997) and 9-27117(1997) or the like).

Also, it is known that in order to decrease an amount of carbon black fine particles added to the magnetic recording layer and reduce a light transmittance of the magnetic recording medium, blackish brown acicular hematite particles or blackish brown acicular iron oxide hydroxide particles are used as the non-magnetic particles for non-magnetic undercoat layer (Japanese Patent Application Laid-open (KOKAI) Nos. 7-66020(1995), 8-259237(1996) and 9-167333(1997)).

It is also known to use non-magnetic acicular particles such as acicular hematite particles and acicular iron oxide hydroxide particles on which surfaces carbon black is adhered in an amount of 1 to 20 parts by weight based on 100 parts by weight of the non-magnetic acicular particles (European Patent No. 0924690 A).

Further, it is known that in order to reduce an electric resistance of the magnetic recording medium, a mixture of non-magnetic iron oxide particles and carbon black fine particles is used as the non-magnetic particles for non-magnetic undercoat layer (Japanese Patent Application Laid-open (KOKAI) Nos. 1-213822(1989), 1-300419 (1989), 6-236542(1994) and 9-297911(1997) or the like).

At present, it has been most demanded to provide magnetic recording media having a smooth surface, a lower light transmittance, a lower surface resistivity value and an excellent running property. However, non-magnetic particles for non-magnetic undercoat layer which can provide such magnetic recording media satisfying all of the above requirements, have not been obtained.

Namely, the magnetic recording media produced by using the above conventional acicular hematite particles or acicular iron oxide hydroxide particles whose surfaces are coated with a hydroxide of aluminum, an oxide of aluminum, a hydroxide of silicon or an oxide or silicon, as non-magnetic particles for non-magnetic undercoat layer, have a smooth surface, but fail to reduce a light transmittance thereof because the non-magnetic particles exhibit from dark-red to yellowish brown color. Further, these magnetic recording media have a surface resistivity value as high as about $10^{13}$ $\Omega/cm^2$, and a friction coefficient (as an index of the running property) as poor as about 0.33.

Further, in the case of the above-mentioned substrate using as non-magnetic particles for non-magnetic undercoat layer, blackish brown acicular hematite particles or blackish brown acicular iron oxide hydroxide particles, the obtained non-magnetic undercoat layer can show a higher degree of blackness as compared to those using the dark red acicular hematite particles or the yellowish brown acicular iron oxide hydroxide particles, so that it becomes possible to reduce a light transmittance of the substrate. However, the reduction of light transmittance is still insufficient. In addition, the surface resistivity of the non-magnetic substrate is as large as about $10^{12}$ $\Omega/cm^2$, and a friction coefficient (as an index of the running property) as poor as about 0.33.

In the case of a magnetic recording medium produced by using non-magnetic particles for a non-magnetic undercoat layer described in European Patent No. 0924690 A, due to an excellent blackness and conductivity of carbon black, the light transmittance and surface resistivity value of the magnetic recording medium are improved. Especially, most excellent linear absorption as an index of the light transmittance thereof is 2.71 $\mu m^{-1}$ and the surface resistivity value thereof is $1.2 \times 10^8$ $\Omega/cm^2$. As shown in Comparative example described later, the friction coefficient as an index of the running property is as poor as about 0.32.

In the case of the non-magnetic particles described in the above-mentioned Japanese Patent Application Laid-open (KOKAI) Nos. 1-213822(1989), 1-300419(1989) and 9-297911(1997), there have been used the mixture of non-magnetic iron oxide particles and carbon black fine particles in which the carbon black fine particles are added in an amount of not less than 25 parts by weight based on 100 parts by weight of the non-magnetic iron oxide particles. Therefore, due to the fact that the carbon black fine particles which show the largest degree of blackness among various black pigments, are used in such a large amount, it is possible to obtain a non-magnetic substrate having a low light transmittance and a low electric resistance. However, it has been difficult to disperse the carbon black fine particles in vehicles, since the carbon black fine particles are fine particles having such a small average diameter as about 0.002 to about 0.05 $\mu m$, a large specific surface area and a deteriorated solvent wettability, thereby failing to obtain a non-magnetic substrate having a smooth surface. Also, the friction coefficient (as an index of the running property) is as poor as about 0.31. In addition, the carbon black fine particles have a bulk density as low as about 0.1 g/cm$^3$ and, therefore, the carbon black fine particles are bulky particles, resulting in deteriorated handing property and workability. Further, with respect to the carbon black fine particles, many problems concerning safety or hygiene such as carcinogenesis have been pointed out.

Thus, as the amount of the carbon black fine particles added to the non-magnetic substrate is increased, the light transmittance of the obtained non-magnetic substrate tends to become small. However, when the carbon black fine particles are used in a large amount, it becomes more difficult to disperse the particles in vehicles, resulting in deteriorated workability. Further, the use of a large amount of the carbon black fine particles are disadvantageous in view of safety and hygiene.

In the above-mentioned Japanese Patent Application Laid-open (KOKAI) No. 6-236542(1994), there have been described such non-magnetic particles mixture of non-magnetic iron oxide particles and carbon black fine particles having a specific structure in which the carbon black fine particles are used in an amount of 1 to 17.6 parts by weight based on 100 parts by weight of the non-magnetic iron oxide particles. By using such specific carbon black fine particles having a high conductivity, the electric resistance of the obtained non-magnetic substrate can be reduced even at small carbon black fine particles content. However, since the amount of carbon black fine particles used is small, it is difficult to reduce a light transmittance of the non-magnetic substrate.

As a result of the present inventors' earnest studies for solving the above conventional problems, it has been found that by using as non-magnetic particles non-magnetic acicular black iron-based composite particles which comprise acicular hematite particles or acicular iron oxide hydroxide particles as core particles; a coating layer formed on the surface of each core particle, at least one organosilicon compound; and a carbon black coat formed on at least a part of the surface of the coating layer in an amount of 21 to 50 parts by weight based on 100 parts by weight of the acicular hematite particles or acicular iron oxide hydroxide particles, and which have an average major axial diameter of 0.011 to 0.35 $\mu m$ and a myristic acid absorption of 0.01 to 0.3 mg/m$^2$, the obtained magnetic recording medium can exhibit a smooth surface, a lower light transmittance, a lower surface resistivity value, a low friction coefficient and an excellent running property. The present invention has been attained on the basis of this finding.

SUMMARY OF THE INVENTION

An object of the present invention is to provide a magnetic recording medium exhibiting a smooth surface, a lower light transmittance, a lower surface resistivity value, a low friction coefficient and an excellent running property.

Another object of the present invention is to provide non-magnetic acicular black iron-based composite particles exhibiting an excellent dispersibility in vehicle due to less amount of carbon black desorbed or fallen-off from the surface of each composite particle, a more excellent blackness, a lower volume resistivity value and a well-controlled myristic acid absorption, and a process for producing the composite particles.

A further object of the present invention is to provide a non-magnetic substrate for magnetic recording media, having a smooth surface and a lower surface resistively value.

To accomplish the aims, in a first aspect of the present invention, there is provided a magnetic recording medium comprising:

a non-magnetic base film;

a non-magnetic undercoat layer formed on the non-magnetic base film, comprising a binder resin and non-magnetic acicular black iron-based composite particles; and a magnetic coating film formed on the non-magnetic undercoat layer, comprising a binder resin and magnetic particles, the said non-magnetic acicular black iron-based composite particles having an average major axis diameter of usually 0.011 to 0.35 $\mu$m, comprising:

acicular hematite particles or acicular iron oxide hydroxide particles;

a coating layer formed on the surface of the acicular hematite particle or acicular iron oxide hydroxide particle, comprising at least one organosilicon compound selected from the group consisting of:

(1) organosilane compounds obtained from an alkoxysilane compounds, and (2) polysiloxanes or modified polysiloxanes; and a single carbon black coat formed on at least a part of the coating layer comprising the organosilicon compound, in an amount of 21 to 50 parts by weight based on 100 parts by weight of the acicular hematite particles or acicular iron oxide hydroxide particles.

In a second aspect of the present invention, there is provided a magnetic recording medium comprising:

a non-magnetic base film;

a non-magnetic undercoat layer formed on the non-magnetic base film, comprising a binder resin and non-magnetic acicular black iron-based composite particles; and a magnetic coating film formed on the non-magnetic undercoat layer, comprising a binder resin and magnetic particles, the said non-magnetic acicular black iron-based composite particles having an average major axis diameter of usually 0.011 to 0.35 $\mu$m, comprising:

acicular hematite particles or acicular iron oxide hydroxide particles;

a coat formed on at least a part of the surface of the acicular hematite particles or acicular iron oxide hydroxide particles, comprising at least one compound selected from the group consisting of hydroxides of aluminum, oxides of aluminum, hydroxides of silicon and oxides of silicon;

a coating layer formed on the said coat formed on the surface of the acicular hematite particle or acicular iron oxide hydroxide particle, comprising at least one organosilicon compound selected from the group consisting of:

(1) organosilane compounds obtained from an alkoxysilane compounds, and (2) polysiloxanes or modified polysiloxanes; and a single carbon black coat formed on at least a part of the coating layer comprising the organosilicon compound, in an amount of 21 to 50 parts by weight based on 100 parts by weight of the acicular hematite particles or acicular iron oxide hydroxide particles.

In a third aspect of the present invention, there is provided a non-magnetic substrate comprising:

a non-magnetic base film; and a non-magnetic undercoat layer formed on the non-magnetic base film, comprising a binder resin and non-magnetic acicular black iron-based composite particles, the said non-magnetic acicular black iron-based composite particles having an average major axis diameter of usually 0.011 to 0.35 $\mu$m, comprising:

acicular hematite particles or acicular iron oxide hydroxide particles;

a coating layer formed on the surface of the acicular hematite particle or acicular iron oxide hydroxide particle, comprising at least one organosilicon compound selected from the group consisting of:

(1) organosilane compounds obtained from an alkoxysilane compounds, and (2) polysiloxanes or modified polysiloxanes; and a single carbon black coat formed on at least a part of the coating layer comprising the organosilicon compound, in an amount of 21 to 50 parts by weight based on 100 parts by weight of the acicular hematite particles or acicular iron oxide hydroxide particles.

In a fourth aspect of the present invention, there is provided a non-magnetic substrate comprising:

a non-magnetic base film; and a non-magnetic undercoat layer formed on the non-magnetic base film, comprising a binder resin and non-magnetic acicular black iron-based composite particles, the said non-magnetic acicular black iron-based composite particles having an average major axis diameter of usually 0.011 to 0.35 $\mu$m comprising:

acicular hematite particles or acicular iron oxide hydroxide particles;

a coat formed on at least a part of the surface of the acicular hematite particles or acicular iron oxide hydroxide particles, comprising at least one compound selected from the group consisting of hydroxides of aluminum, oxides of aluminum, hydroxides of silicon and oxides of silicon;

a coating layer formed on the said coat formed on the surface of the said acicular hematite particle or acicular iron oxide hydroxide particle, comprising at least one organosilicon compound selected from the group consisting of:

(1) organosilane compounds obtained from an alkoxysilane compounds, and (2) polysiloxanes or modified polysiloxanes; and a single carbon black coat formed on at least a part of the coating layer comprising the organosilicon compound, in an amount of 21 to 50 parts by weight based on 100 parts by weight of the acicular hematite particles or acicular iron oxide hydroxide particles.

In a fifth aspect of the present invention, there are provided non-magnetic acicular black iron-based composite particles having an average major axis diameter of usually 0.011 to 0.35 $\mu$m, comprising:

acicular hematite particles or acicular iron oxide hydroxide particles;

a coating layer formed on the surface of the acicular hematite particle or acicular iron oxide hydroxide particle, comprising at least one organosilicon compound selected from the group consisting of:

(1) organosilane compounds obtained from an alkoxysilane compounds, and (2) polysiloxanes or modified polysiloxanes; and a single carbon black coat formed on at least a part of the coating layer comprising the organosilicon compound, in an amount of 21 to 50 parts by weight based on 100 parts by weight of the acicular hematite particles or acicular iron oxide hydroxide particles.

In a sixth aspect of the present invention, there are provided non-magnetic acicular black iron-based composite particles having an average major axis diameter of usually 0.011 to 0.35 µm, comprising:

acicular hematite particles or acicular iron oxide hydroxide particles;

a coat formed on at least a part of the surface of the acicular hematite particles or acicular iron oxide hydroxide particles, comprising at least one compound selected from the group consisting of hydroxides of aluminum, oxides of aluminum, hydroxides of silicon and oxides of silicon;

a coating layer formed on the said coat formed on the surface of the acicular hematite particle or acicular iron oxide hydroxide particle, comprising at least one organosilicon compound selected from the group consisting of:

(1) organosilane compounds obtained from an alkoxysilane compounds, and (2) polysiloxanes or modified polysiloxanes; and a single carbon black coat formed on at least a part of the coating layer comprising the organosilicon compound, in an amount of 21 to 50 parts by weight based on 100 parts by weight of the acicular hematite particles or acicular iron oxide hydroxide particles.

DETAILED DESCRIPTION OF THE INVENTION

Firstly, a magnetic recording medium and a non-magnetic substrate therefor according to the present invention is described.

The magnetic recording medium according to the present invention comprises:

a non-magnetic base film;

a non-magnetic undercoat layer formed on the non-magnetic base film, comprising a binder resin and non-magnetic acicular black iron-based composite particles; and a magnetic coating film formed on the non-magnetic undercoat layer, comprising a binder resin and magnetic particles.

The non-magnetic substrate according to the present invention comprises:

a non-magnetic base film; and a non-magnetic undercoat layer formed on the non-magnetic base film, comprising a binder resin and the non-magnetic acicular black iron-based composite particles.

The non-magnetic acicular black iron-based composite particles used as non-magnetic particles contained in a non-magnetic undercoat layer, have an average major axis diameter of 0.011 to 0.35 µm, and comprise:

acicular hematite particles or acicular iron oxide hydroxide particles;

a coating layer formed on the surface of the acicular hematite particle or acicular iron oxide hydroxide particle, comprising at least one organosilicon compound, and a single carbon black coat formed on at least a part of the coating layer comprising the organosilicon compound coated, in an amount of 21 to 50 parts by weight based on 100 parts by weight of the acicular hematite particles or acicular iron oxide hydroxide particles.

The particle shape and particle size of the non-magnetic acicular black iron-based composite particles according to the present invention are considerably varied depending upon those of acicular hematite particles or acicular iron oxide hydroxide particles as core particles. Specifically, the non-magnetic acicular black iron-based composite particles are substantially similar in particle shape to that of the core particles, and have a slightly larger particle size than that of the core particles.

The non-magnetic acicular black iron-based composite particles according to the present invention have an average major axis diameter of usually 0.011 to 0.35 µm, preferably 0.018 to 0.30 µm, more preferably 0.024 to 0.24 µm; an average minor axis diameter of usually 0.006 to 0.18 µm, preferably 0.012 to 0.15 µm, more preferably 0.015 to 0.12 µm; an aspect ratio (average major axis diameter/average minor axis diameter) of usually 2:1 to 20:1, preferably 2.5:1 to 18:1, more preferably 3:1 to 15:1; and a BET specific surface area of usually 35 to 300 $m^2/g$, preferably 38 to 250 $m^2/g$, more preferably 40 to 230 $m^2/g$.

When the average major axis diameter of the non-magnetic acicular black iron-based composite particles is less than 0.011 µm, the intermolecular force between the particles may be increased due to the fineness thereof, so that it may become difficult to uniformly disperse the particles in a vehicle. On the other hand, when the average major axis diameter thereof is more than 0.35 µm, since the non-magnetic acicular black iron-based composite particles are coarse, the surface smoothness of the coating film formed using such particles may be impaired.

Further, it is preferred that the non-magnetic acicular black iron-based composite particles according to the present invention have a geometrical standard deviation of major axis diameter of not more than 1.50. When the geometrical standard deviation of major axis diameter is more than 1.50, since coarse particles tend to be present in the non-magnetic acicular black iron-based composite particles, the surface smoothness of the coating film formed using such particles may be impaired. With the consideration of the surface smoothness, the geometrical standard deviation of major axis diameter of the non-magnetic acicular black iron-based composite particles according to the present invention is preferably not more than 1.48, more preferably not more than 1.45. Further, in view of industrial production of the non-magnetic acicular black iron-based composite particles, the lower limit of the geometrical standard deviation of major axis diameter is preferably 1.01.

The upper limit of the blackness of the non-magnetic acicular black iron-based composite particles according to the present invention is usually 23.0 when represented by a L* value thereof. When the L* value as the upper limit of the blackness is more than 23.0, since the lightness of the non-magnetic acicular black iron-based composite particles is increased, it is difficult to reduce the light transmittance of the magnetic recording medium. The preferable upper limit of the blackness thereof is 22.5.

The upper limit of the blackness of the non-magnetic acicular black iron-based composite particles obtained by using the acicular manganese-containing hematite particles or the acicular manganese-containing iron oxide hydroxide particles as the core particles, is usually 21.5, preferably 20.5 when represented by a L* value thereof.

The lower limit of the blackness is preferably about 15 when represented by a L* value.

The volume resistivity of the non-magnetic acicular black iron-based composite particles according to the present invention is preferably not more than $1 \times 10^6$ Ω·cm, more preferably $1 \times 10^1$ to $5 \times 10^5$ Ω·cm, still more preferably $1 \times 10^1$ to $1 \times 10^5$ Ω·cm. When the volume resistivity is more than $1 \times 10^6$ Ω·cm, it is difficult to sufficiently lower the surface resistivity of the magnetic recording medium.

The non-magnetic acicular black iron-based composite particles according to the present invention exhibit a myristic acid absorption of usually 0.01 to 0.3 mg/m$^2$, preferably 0.01 to 0.28 mg/m$^2$, more preferably 0.01 to 0.26 mg/m$^2$.

When the myristic acid absorption is less than 0.01 mg/m$^2$, the amount of myristic aced absorbed onto the non-magnetic acicular black iron-based composite particles is too small, so that it may become difficult to effectively control the amount of myristic acid oozed onto the surface of the magnetic recording layer. As a result, the obtained magnetic recording medium such as magnetic tape may not maintain a sufficiently low friction coefficient for a long period of time upon repeated use thereof.

When the myristic acid absorption is more than 0.3 mg/m$^2$ the amount of myristic acid absorbed onto the non-magnetic acicular black iron-based composite particles is too large, so that the amount of myristic acid oozed onto the surface of the magnetic recording layer is considerably reduced. As a result, it may become difficult to assure a good running property of the obtained magnetic recording medium.

The percentage of desorption of carbon black from the non-magnetic acicular black iron-based composite particles according to the present invention is usually not more than 20%, preferably not more than 10%. When the desorption percentage of carbon black is more than 20%, the desorbed carbon black tend to inhibit the composite particles from being uniformly dispersed in a vehicle upon the production of non-magnetic coating composition.

In the non-magnetic acicular black iron-based composite particles according to the present invention, the surfaces of the acicular hematite particles or the acicular iron oxide hydroxide particles as the core particles may be preliminarily coated with at least one compound selected from the group consisting of hydroxide of aluminum, oxides of aluminum, hydroxides of silicon and oxides of silicon (hereinafter referred to as "hydroxides and/or oxides of aluminum and/or silicon"), if required. In this case, the dispersibility of the obtained composite particles in a vehicle may become improved as compared to those having no undercoat composed of hydroxides and/or oxides of aluminum and/or silicon, because the percentage of desorption of carbon black from the non-magnetic acicular black iron-based composite particles is lessened.

The amount of the hydroxides and/or oxides of aluminum and/or silicon coat is 0.01 to 50% by weight calculated as Al, SiO$_2$ or a sum of Al and SiO$_2$, based on the weight of the acicular hematite particles or the acicular iron oxide hydroxide particles as the core particles.

By coating the core particle with the hydroxides and/or oxides of aluminum and/or silicon, the percentage of desorption of carbon black from the obtained non-magnetic acicular black iron-based composite particles of the present invention can be lessened effectively.

The non-magnetic acicular black iron-based composite particles using as core particles the acicular hematite particles or the acicular iron oxide hydroxide particles having the coat composed of the hydroxides and/or oxides of aluminum and/or silicon may be substantially identical in a particle size, a geometrical standard deviation, a BET specific surface area, a blackness (L* value), a volume resistivity and a myristic acid absorption, to those having no hydroxides and/or oxides of aluminum and/or silicon coat.

By coating the core particle with the hydroxides and/or oxides of aluminum and/silicon, the percentage of desorption of carbon black from the obtained non-magnetic acicular black iron-based composite particles of the present invention is preferably not more than 10%, more preferably not more than 5%.

The acicular hematite particles as core particles assume usually a red color and the acicular iron oxide hydroxide particles assume usually yellow color. In order to produce non-magnetic acicular black iron-based composite particles having a more excellent blackness, it is preferred to use acicular manganese-containing hematite particles or acicular manganese-containing iron oxide hydroxide particles, both which contain manganese in an amount of 5 to 40% by weight based on the weight of the acicular manganese-containing hematite particles or acicular manganese-containing iron oxide hydroxide particles used as the core particles of the non-magnetic acicular black iron-based composite particles according to the present invention.

The particle shape of the acicular hematite particles or the acicular iron oxide hydroxide particles as the core particles may include not only acicular shape but also spindle shape, rice ball shape or the like.

The average major axis diameter of the acicular hematite particles or the acicular iron oxide hydroxide particles as the core particles is usually 0.01 to 0.3 μm, preferably 0.015 to 0.25 μm, more preferably 0.02 to 0.2 μm.

If the average major axis diameter thereof exceeds 0.3 μm, since the average major axis diameter of the obtained non-magnetic acicular black iron-based composite particles therefrom become coarse particles, the surface smoothness of the coating film formed using such particles may be impaired. On the other hand, it the average major axis diameter thereof is less than 0.01 μm the non-magnetic particles may become extremely fine, so that the agglomeration of the non-magnetic particles tends to occur due to the increased intermolecular force therebetween. As a result, it is difficult to uniformly coat with an organosilicon compound and to uniformly coat with a carbon black through the organosilicon compound.

The average minor axis diameter of the acicular hematite particles or the acicular iron oxide hydroxide particles as the core particles is usually 0.005 to 0.15 μm, preferably 0.010 to 0.125 μm, more preferably 0.012 to 0.10 μm.

If the average minor axis diameter thereof exceeds 0.15 μm, since the average minor axis diameter of the obtained non-magnetic acicular black iron-based composite particles therefrom become coarse particles, the surface smoothness of the coating film formed using such particles may be impaired. On the other hand, if the average minor axis diameter thereof is less than 0.005 μm, the non-magnetic particles may become extremely fine, so that the agglomeration of the non-magnetic particles tends to occur due to the increased intermolecular force therebetween. As a result, it is difficult to uniformly coat with an organosilicon compound and to uniformly coat with a carbon black through the organosilicon compound.

The aspect ratio (=average major axis diameter:average minor axis diameter, hereinafter referred to merely as "aspect ratio") of the acicular hematite particles or the acicular iron oxide hydroxide particles as the core particles is usually 2:1 to 20:1, preferably 2.5:1 to 18:1, more preferably 3:1 to 15:1. When the aspect ratio is more than 20:1, the particles may be entangled with each other, so that the agglomeration of the non-magnetic particles tends to occur due to the increased intermolecular force therebetween. As a result, it is difficult to uniformly coat with an organosilicon compound and to uniformly coat with a carbon black through the organosilicon compound. On the other hand, when the aspect ratio is less than 2:1, it may be difficult to obtain a coating film having a sufficient strength.

The BET specific surface area of the acicular hematite particles or the acicular iron oxide hydroxide particles as the core particles is usually 35 to 250 m$^2$/g, preferably 38 to 200 m$^2$/g, more preferably 40 to 180 m$^2$/g.

If the BET specific surface area thereof is more than 250 m$^2$/g, the increase of the intermolecular force due to the fine particles. As a result, it may be difficult to uniformly coat with the organosilicon compounds, and to uniformly form the carbon black coat on the coating layer composed of the organosilicon compounds. On the other hand, if the BET specific surface area thereof is less than 35 m$^2$/g, the acicular hematite particles or the acicular iron oxide hydroxide particles may be coarse particles or large particles produced by sintering a particle and between particles, which are apt to exert a deleterious influence on the surface smoothness of the coating film formed using such particles.

The geometrical standard deviation of the major axis diameter of the acicular hematite particles or the acicular iron oxide hydroxide particles as the core particles is usually not more than 1.50. If the geometrical standard deviation of the major axis diameter thereof exceeds 1.50, due to the coarse particles, it is difficult to uniformly coat with an organosilicon compound and to uniformly coat with a carbon black through the organosilicon compound. With the consideration of uniformly coating the surfaces of the hematite particles or iron oxide hydroxide particles with the organosilicon compounds, and uniformly forming the carbon black coat on the coating layer composed of the organosilicon compounds, the upper limit thereof is preferably 1.48, more preferably not more than 1.45. From the point of view of industrial productivity, the lower limit thereof is preferably 1.01.

With respect of the blackness of the acicular hematite particles as the core particles, in case of the acicular hematite particles, the lower limit of the blackness thereof, when represented by the L* value, is usually 18, and the upper limit thereof is usually 38, preferably 36. In the case of the acicular black manganese-containing hematite particles, the lower limit of the blackness thereof as the core particles when represented by he L* value, is usually 18, and the upper limit thereof is usually 30, preferably 28.

With respect to the blackness of the acicular iron oxide hydroxide particles as the core particles, in the case of the acicular iron oxide hydroxide particles, the lower limit of the blackness thereof, when represented by the L* value, is usually 18, and the upper limit thereof is usually 40, preferably 38. In the case of the acicular black manganese-containing iron oxide hydroxide particles, the lower limit of the blackness thereof, when represented by the L* value, is usually 18, and the upper limit thereof is usually 32, preferably 30.

When the L* value is more than the above upper limit, the blackness of the core particles is insufficient, thereby failing to obtain the non-magnetic acicular black iron-based composite particles having an excellent blackness.

The volume resistivity value of the acicular hematite particles or acicular iron oxide hydroxide particles as the core particles is usually not more than 5.0×10$^9$ Ω·cm.

The myristic acid absorption of the acicular hematite particles or acicular iron oxide hydroxide particles as the core particles is usually 0.40 to 1.0 mg/m$^2$, preferably 0.40 to 0.80 mg/m$^2$.

The surfaces of the acicular hematite particles or the acicular iron oxide hydroxide particles as the core particles may be coated with at least one compound selected from the group consisting of hydroxide of aluminum, oxides of aluminum, hydroxides of silicon and oxides of silicon (hereinafter referred to as "hydroxides and/or oxides of aluminum and/or silicon"), if required. In this case, the percentage of desorption of carbon black of the obtained composite particles in a vehicle may become improved as compared to those having no undercoat composed of hydroxides or oxides of aluminum or silicon.

The amount of the hydroxides and/or oxides of aluminum and/or silicon coat is preferably 0.01 to 50% by weight (calculated as Al, SiO$_2$, or a sum of Al and SiO$_2$) based on the total weight of the core particles. When the amount of the hydroxides and/or oxides of aluminum and/or silicon coat is in the range of 0.01 to 50% by weight, it is possible to effectively reduce the carbon black desorption percentage.

The coating layer formed on the surfaces of the core particles comprises at least one organosilicon compound selected from the group consisting of: (1) organosilane compounds obtained from alkoxysilane compounds; (2) polysiloxanes; and (2') modified polysiloxanes selected from the group consisting of: (2-A) polysiloxanes modified with at least one compound selected from the group consisting of polyethers, polyesters and epoxy compounds (hereinafter referred to merely as "modified polysiloxanes"), and (2-B) polysiloxanes whose molecular terminal is modified with at least one group selected from the group consisting of carboxylic acid groups, alcohol groups and a hydroxyl group (hereinafter referred to merely as "terminal-modified polysiloxanes").

The organosilane compounds (1) can be produced from alkoxysilane compounds represented by the formula (I):

$$R^1{}_a SiX_{4-a} \qquad (I)$$

wherein R$^1$ is C$_6$H$_5$—, (CH$_3$)$_2$CHCH$_2$— or n—C$_b$H$_{2b-1}$— (wherein b is an integer of 1 to 18); X is CH$_3$O— or C$_2$H$_5$O—; and a is an integer of 0 to 3.

The alkoxysilane compounds may be dried or heat-treated, for example, at a temperature of usually 40 to 200° C., preferably 60 to 150° C. for usually 10 minutes to 12 hours, preferably 30 minutes to 3 hours.

Specific examples of the alkoxysilane compounds may include methyltriethoxysilane, dimethyldiethoxysilane, phenyltriethyoxysilane, diphenyldiethoxysilane, methyltrimethoxysilane, dimethyldimethoxysilane, phenyltrimethoxysilane, diphenyldimethoxysilane, isobutyltrimethoxysilane, decyltrimethoxysilane or the like. Among these alkoxysilane compounds, in view of the desorption percentage and the adhering effect of carbon black, methyltriethoxysilane, phenyltriethyoxysilane, methyltrimethoxysilane, dimethyldimethoxysilane and isobutyltrimethoxysilane are preferred, and methyltriethoxysilane and methyltrimethoxysilane are more preferred.

As the polysiloxanes (2), there may be used those compounds represented by the formula (II):

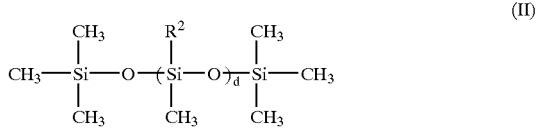

wherein $R^2$ is H— or $CH_3$—, and d is an integer of 15 to 450.

Among these polysiloxanes, in view of the desorption percentage and the adhering effect of carbon black, polysiloxanes having methyl hydrogen siloxane units are preferred.

As the modified polysiloxanes (2-A), there may be used:

(a1) polysiloxanes modified with polyethers represented by the formula (III):

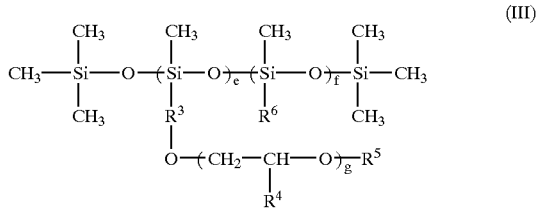

wherein $R^3$ is —$(-CH_2-)_h$—; $R^4$ is —$(-CH_2-)_i$—$CH_3$; $R^5$ is —OH, —COOH, —CH=$CH_2$, —C($CH_3$)=$CH_2$ or —$(-CH_2-)_j$—$CH_3$; $R^6$ is —$(-CH_2-)_k$—$CH_3$; g and h are an integer of 1 to 15; i, j and k are an integer of 0 to 15; e is an integer of 1 to 50; and f is an integer of 1 to 300;

(a2) polysiloxanes modified with polyesters represented by the formula (IV):

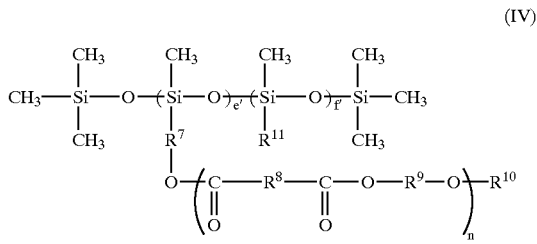

wherein $R^7$, $R^8$ and $R^9$ are —$(-CH_2-)_q$— and may be the same or different; $R^{10}$ is —OH, —COOH, —CH=$CH_2$, —C($CH_3$)=$CH_2$ or —$(-CH_2-)_r$—$CH_3$; $R^{11}$ is —$(-CH_2-)_s$—$CH_3$; n and q are an integer of 1 to 15; r and s are an integer of 0 to 15; e' is an integer of 1 to 50; and f' is an integer of 1 to 300;

(a3) polysiloxanes modified with epoxy compounds represented by the formula (V):

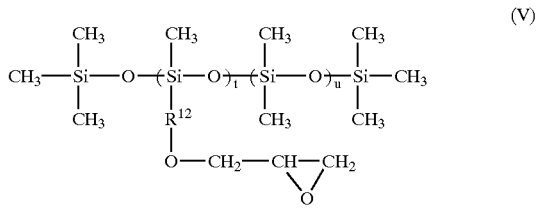

wherein $R^{12}$ is —$(-CH_2-)_v$—; v is an integer of 1 to 15; t is an integer of 1 to 50; and u is an integer of 1 to 300; or a mixture thereof.

Among these modified polysiloxanes (2-A), in view of the desorption percentage and the adhering effect of carbon black, the polysiloxanes modified with the polyethers represented by the formula (III), are preferred.

As the terminal-modified polysiloxanes (2-B), there may be used chose represented by the formula (VI):

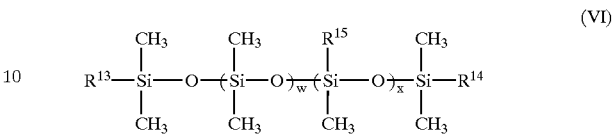

wherein and are $R^{13}$ and $R^{14}$ are —OH, $R^{16}$OH or $R^{17}$COOH and may be the same or different; $R^{15}$ is —$CH_3$ or —$C_6H_5$; $R^{16}$ and $R^{17}$ are —$(-CH_2-)_y$—; y is an integer of 1 to 15; w is an integer of 1 to 200; and x is an integer of 0 to 100.

Among these terminal-modified polysiloxanes, in view of the desorption percentage and the adhering effect of carbon black, the polysiloxanes whose terminals are modified with carboxylic acid groups are preferred.

The amount of the coating layer composed of the organosilicon compounds is usually 0.02 to 5.0% by weight, preferably 0.03 to 4.0% by weight, more preferably 0.05 to 3.0% by weight (calculated as Si) based on the weight of the acicular hematite particles or the acicular iron oxide hydroxide particles coated with the organosilicon compounds.

When the amount of the coating layer composed of the organosilicon compounds is less than 0.02% by weight, it may become difficult to adhere a carbon black on the coating layer. On the other hand, even when the coating amount of the organosilicon compounds is more than 5.0% by weight, a sufficient amount of carbon black coat can be formed on the surface of the coating layer.

The a carbon black coat constituting by a single carbon black coat is formed on at least a part of the coating layer composed of the organosilicon compounds.

The total amount of carbon black adhered is 21 to 50 parts by weight based on 100 parts by weight of the core particles.

When the amount of carbon black coated is less than 21 parts by weight, it is difficult to reduce the myristic acid absorption to not more than 0.3 mg/m². On the contrary, when the amount of carbon black coated is more than 50 parts by weight, the myristic acid absorption of the obtained composite particles is as low as less than 0.01 mg/m². As a result, it becomes difficult to effectively control the amount of myristic acid oozed onto the surface of the magnetic recording layer.

The thickness of carbon black coat formed is preferably not more than 0.06 μm, more preferably not more than 0.05 μm, still more preferably not more than 0.04 μm. The lower limit thereof is more preferably 0.0001 μm.

Next, the non-magnetic substrate according to the present invention is described.

The non-magnetic substrate according to the present invention is constituted by a non-magnetic base film and a non-magnetic undercoat layer formed on the non-magnetic base film, comprising a binder resin and the non-magnetic acicular black iron-based composite particles.

As the non-magnetic base film, the following materials which are at present generally used for the production of a magnetic recording medium are usable as a raw material: a synthetic resin such as polyethylene terephthalate, polyethylene, polypropylene, polycarbonate, polyethylene naphthalate, polyamide, polyamideimide and polyimide; foil and plate of a metal such as aluminum and stainless steel;

and various kinds of paper. The thickness of the non-magnetic base film varies depending upon the material, but it is usually about 1.0 to 300 μm, preferably 2.0 to 200 μm.

In the case of a magnetic disc, polyethylene terephthalate is usually used as the non-magnetic base film. The thickness thereof is usually 50 to 300 μm, preferably 60 to 200 μm. In the case of a magnetic tape, when polyethylene terephthalate is used as the base film, the thickness thereof is usually 3 to 100 μm, preferably 4 to 20 μm. When polyethylene naphthalate is used, the thickness thereof is usually 3 to 50 μm, preferably 4 to 20 μm. When polyamide is used, the thickness thereof is usually 2 to 10 μm, preferably 3 to 7 μm.

The non-magnetic undercoat layer of the present invention preferably has a film thickness of 0.2 to 10.0 μm. When the thickness of the non-magnetic undercoat layer is less than 0.2 μm, it is difficult to improve the surface roughness of the non-magnetic substrate, and the stiffness of the non-magnetic undercoat layer tends to be insufficient. In the consideration of reduction in thickness of the obtained magnetic recording medium and stiffness of the coating film, the thickness of the non-magnetic undercoat layer is more preferably in the range of 0.5 to 5.0 μm.

As the binder resin used in the present invention, the following resins which are at present generally used or the production of a magnetic recording medium are usable: vinyl chloride-vinyl acetate copolymer, urethane resin, vinyl chloride-vinyl acetate-maleic acid copolymer, urethane elastomer, butadiene-acrylonitrile copolymer, polyvinyl butyral, cellulose derivative such as nitrocellulose, polyester resin, synthetic rubber resin such as polybutadiene, epoxy resin, polyamide resin, polyisocyanate, electron radiation curing acryl urethane resin and mixtures thereof.

Each of these resin binders may contain a functional group such as —OH, —COOH, —SO$_3$M, —OPO$_2$M$_2$ and —NH$_2$, wherein M represents H, Na or K. With the consideration of the dispersibility of the particles, a binder resin containing a functional group —COOH or —SO$_3$M is preferable.

The mixing ratio of the non-magnetic acicular black iron-based composite particles with the binder resin is usually 5 to 2000 parts by weight, preferably 100 to 1000 parts by weight based on 100 parts by weight of the binder resin.

When the amount of the non-magnetic acicular black iron-based composite particles blended is less than 5 parts by weight, the amount of the non-magnetic acicular black iron-based composite particles contained in the non-magnetic coating composition is too small. As a result, there may not be formed a coating film in which the non-magnetic acicular black iron-based composite particles are continuously dispersed, and the surface smoothness of the coating film and the stiffness of the non-magnetic substrate may become insufficient. When the amount of the non-magnetic acicular black iron-based composite particles blended is more than 2,000 parts by weight, the amount of the non-magnetic acicular black iron-based composite particles becomes too large as compared to that of the binder resin, thereby failing to sufficiently disperse the non-magnetic acicular black iron-based composite particles in the non-magnetic coating composition. As a result, it may be difficult to form a coating film having a sufficiently smooth surface. Further, the non-magnetic acicular black iron-based composite particles may not be sufficiently bound together by the binder resin, so that the obtained coating film becomes brittle.

A lubricant, a polishing agent, an antistatic agent, etc. which are generally used for the production of a magnetic recording medium may be added to the non-magnetic undercoat layer in amount of usually 0.1 to 50 parts by weight based on 100 parts by weight of the binder resin.

The non-magnetic substrate according to the present invention has the following properties.

The non-magnetic substrate according to the present invention has a gloss (of the coating film) of usually 170 to 280%; a surface roughness Ra (of the coating film) of usually 2.0 to 12.0 nm; a Young's modulus (relative value to a commercially available video tape: and AV T-120 produced by Victor Company of Japan, Limited) of usually 117 to 150; a linear adsorption coefficient (of the coating film) of usually 1.50 to 5.00 μm$^{-1}$; and a surface resistivity of 1×10$^3$ to 1×10$^{11}$ Ω/cm$^2$.

In case of using the non-magnetic acicular black iron-based composite particles as non-magnetic particles, in which the organosilicon compound is formed on the surface of the acicular hematite particle or acicular iron oxide hydroxide particle, the non-magnetic substrate according to the present invention has a gloss (of the coating film) of usually 170 to 280%, preferably 175 to 280%, more preferably 180 to 280%; a surface roughness Ra (of the coating film) of usually 2.0 to 12.0 nm, preferably 2.0 to 11.5 nm, more preferably 2.0 to 11.0 nm; a Young's modulus (relative value to a commercially available video tape: and AV T-120 produced by Victor Company of Japan, Limited) of usually 117 to 150, preferably 119 to 150, more preferably 121 to 150; a linear adsorption coefficient (of the coating film) of usually 1.50 to 5.00 μm$^{-1}$, preferably 1.55 to 5.00 μm$^{-1}$; and a surface resistivity of 1×10$^3$ to 1×10$^{11}$ Ω/cm$^2$, preferably 1×10$^3$ to 5×10$^{10}$ Ω/cm$^2$, more preferably 1×10$^3$ to 1×10$^{10}$ Ω/cm$^2$.

In case of using the non-magnetic acicular black iron-based composite particles as non-magnetic particles, in which the organosilicon compound is formed on the hydroxides and/or oxides of aluminum and/or silicon coat which are formed on the surface of the acicular hematite particle or acicular iron oxide hydroxide particle, the non-magnetic substrate according to the present invention has a gloss (of the coating film) of usually 175 to 280%, preferably 180 to 280%, more preferably 185 to 280%; a surface roughness Ra (of the coating film) of usually 2.0 to 11.5 nm, preferably 2.0 to 11.0 nm, more preferably 2.0 to 10.5 nm; a Young's modulus (relative value to a commercially available video tape: and AV T-120 produced by Victor Company of Japan, Limited) of usually 118 to 150, preferably 120 to 150, more preferably 122 to 150; a linear adsorption coefficient (of the coating film) of usually 1.50 to 5.00 μm$^{-1}$, preferably 1.55 to 5.00 μm$^{-1}$; and a surface resistivity of 1×10$^3$ to 1×10$^{11}$ Ω/cm$^2$, preferably 1×10$^3$ to 5×10$^{10}$ Ω/cm$^2$, more preferably 1×10$^3$ to 1×10$^{10}$ Ω/cm$^2$.

Next, the magnetic recording medium according to the present invention is described.

The magnetic recording medium according to the present invention is constituted by the non-magnetic substrate and a magnetic coating film formed on the non-magnetic substrate, comprising a binder resin and magnetic particles.

As the magnetic particles used in the present invention, magnetic particles containing iron as a main component are usable, and there may be exemplified magnetic iron oxide particles such as maghemite particles, magnetite particles and berthollide compound particles which are an intermediate oxide between maghemite and magnetite; particles obtained by incorporating any one or more different kinds of elements other than Fe, such as Co, Al, Ni, P, Zn, Si, B or the like in the said magnetic iron oxide particles; Co modified particles obtained by modifying the said magnetic iron oxide particles with cobalt; magnetic acicular metal particles containing iron as a main component, which may contain elements other than Fe at least one selected from the group consisting of Co, Al, Ni, P, Si, Zn, B, Nd, La and Y, including magnetic acicular iron-based alloy particles; magnetoplumbite-type ferrite particles such as plate-like ferrite particles containing Ba, Sr or Ba-Sr; plate-like magnetoplumbite-type ferrite particles obtained by incorporating other metals such as Co, Ni, Zn, Mg, Mn, Ti, Sn, Zr, Nb, Cu, Mo or the like as a coercive force-reducing agent in the plate-like magnetoplumbite-type ferrite particles; or the like.

With the consideration of the short-wavelength recording and the high-density recording, Co-coated magnetic iron oxide particles, magnetic acicular metal particles containing iron as a main component and magnetic acicular iron-based alloy particles containing elements other than Fe at least one selected from the group consisting of Co, Al, Ni, P, Si, Zn, B, Nd, La, Y or the like are preferable.

The magnetic acicular iron-based alloy particles comprising (i) iron and Al; (ii) iron, Co and Al, (iii) iron, Al and at least one rare-earth metal such as Nd, La and Y, or (iv) iron, Co, Al and at least one rare-earth metal such as Nd, La and Y is even more preferable from the point of the durability of the magnetic recording medium. Further, the magnetic acicular iron-based alloy particles comprising iron, Al and at least one rare-earth metal such as Nd, La and Y is most preferable.

More specifically. the magnetic acicular iron-based alloy particles may be exemplified as follows.

1) Magnetic acicular iron-based alloy particles comprises iron; and cobalt of usually 0.05 to 40% by weight, preferably 1.0 to 35% by weight, more preferably 3 to 30% by weight (calculated as Co) based on the weight of the magnetic acicular iron-based alloy particles.

2) Magnetic acicular iron-based alloy particles comprises iron; and aluminum of usually 0.05 to 10% by weight, preferably 0.1 to 7% by weight (calculated as Al) based on the weight of the magnetic acicular iron-based alloy particles.

3) Magnetic acicular iron-based alloy particles comprises iron; cobalt of usually 0.05 to 40% by weight, preferably 1.0 to 35% by weight, more preferably 3 to 30% by weight (calculated as Co) based on the weight of the magnetic acicular iron-based alloy particles; and aluminum of usually 0.05 on 10% by weight, preferably 0.1 to 7% by weight (calculated as Al) based on the weight of the magnetic acicular iron-based alloy particles.

4) Magnetic acicular iron-based alloy particles comprises iron; cobalt of usually 0.05 to 40% by weight, preferably 1.0 to 35% by weight, more preferably 3 to 30% by weight (calculated as Co) based on the weight of the magnetic acicular iron-based alloy particles; and at least one selected from the group consisting of Nd, La and Y of usually 0.05 to 10% by weight, preferably 0.1 to 7% by weight (calculated as the corresponding element) based on the weight of the magnetic acicular iron-based alloy particles.

5) Magnetic acicular iron-based alloy particles comprises iron, aluminum of usually 0.05 to 10% by weight, preferably 0.1 to 7% by weight (calculated as Al) based on the weight of the magnetic acicular iron-based alloy particles; and at least one selected from the group consisting of Nd, La and Y of usually 0.05 to 10% by weight, preferably 0.1 to 7% by weight (calculated as the corresponding element) based on the weight of the magnetic acicular iron-based alloy particles.

6) Magnetic acicular iron-based alloy particles comprises iron; cobalt of usually 0.05 to 40% by weight, preferably 1.0 to 35% by weight, more preferably 3 to 30% by weight (calculated as Co) based on the weight of the magnetic acicular iron-based alloy particles; aluminum of usually 0.05 to 10% by weight, preferably 0.1 to 7% by weight (calculated as Al) based on the weight of the magnetic acicular iron-based alloy particles; and at least one selected from the group consisting of Nd, La and Y of usually 0.05 to 10% by weight, preferably 0.1 to 7% by weight (calculated as the corresponding element) based or the weight of the magnetic acicular iron-based alloy particles.

7) Magnetic acicular iron-based alloy particles comprises iron; cobalt of usually 0.05 to 40% by weight, preferably 1.0 to 35% by weight, more preferably 3 to 30% by weight (calculated as Co) based on the weight of the magnetic acicular iron-based alloy particles; and at least one selected from the group consisting of Ni, P, Si, Zn, Ti, Cu and B of usually 0.05 to 10% by weight, preferably 0.1 to 7% by weight (calculated as the corresponding element) based on the weight of the magnetic acicular iron-based alloy particles.

8) Magnetic acicular iron-based alloy particles comprises iron; aluminum of usually 0.05 to 10% by weight, preferably 0.1 to 7% by weight (calculated as Al) based on the weight of the magnetic acicular iron-based alloy particles; and at least one selected from the group consisting of Ni, P, Si, Zn, Ti, Cu and B of usually 0.05 to 10% by weight, preferably 0.1 to 7% by weight (calculated as the corresponding element) based on the weight of the magnetic acicular iron-based alloy particles.

9) Magnetic acicular iron-based alloy particles comprises iron; cobalt of usually 0.05 to 40% by weight, preferably 1.0 to 35% by weight, more preferably 3 to 30% by weight (calculated as Co) based on the weight of the magnetic acicular iron-based alloy particles; aluminum of usually 0.05 to 10% by weight, preferably 0.1 to 7% by weight (calculated as Al) based or the weight of the magnetic acicular iron-based alloy particles; and at least one selected from the group consisting of Ni, P, Si, Zn, Ti, Cu and B of usually 0.05 to 10% by weight, preferably 0.1 to 7% by weight (calculated as the corresponding element) based on the weight of the magnetic acicular iron-based alloy particles.

10) Magnetic acicular iron-based alloy particles comprises iron; cobalt of usually 0.05 to 40% by weight, preferably 1.0 to 35% by weight, more preferably 3 to 30% by weight (calculated as Co) based on the weight of the magnetic acicular iron-based alloy particles; at least one selected from the group consisting of Nd, La and Y of usually 0.05 to 10% by weight, preferably 0.1 to 7% by weight (calculated as he corresponding element) based on the weight of the magnetic acicular iron-based alloy particles; and at least one selected from the group consisting of Ni, P, Si, Zn, Ti, Cu and B of usually 0.05 to 10% by weight, preferably 0.1 to 7% by weight (calculated as the corresponding element) based on the weight of the magnetic acicular iron-based alloy particles.

11) Magnetic acicular iron-based alloy particles comprises iron; aluminum of usually 0.05 to 10% by weight, preferably 0.1 to 7% by weight (calculated as Al) based on the weight of the magnetic acicular iron-based alloy particles; at least one selected from the group consisting of Nd, La and Y of ordinarily 0.05 to 10% by weight, preferably 0.1 to 7% by weight (calculated as the corresponding element) based on the weight of the magnetic acicular iron-based alloy particles; and at least one selected from the group consisting of Ni, P, Si, Zn, Ti, Cu and B of usually 0.05 to 10% by weight, preferably 0.1 to 7% by weight (calculated as the corresponding element) based on the weight of the magnetic acicular iron-based alloy particles.

12) Magnetic acicular iron-based alloy particles comprises iron; cobalt of usually 0.05 to 40% by weight, preferably 1.0 to 35% by weight, more preferably 3 to 30% by weight (calculated as Co) based on the weight of the magnetic acicular iron-based alloy particles; aluminum of usually 0.05 to 10% by weight, preferably 0.1 to 7% by weight (calculated as Al) based on the weight of the magnetic acicular iron-based alloy particles; at least one selected from the group consisting of Nd, La and Y of usually 0.05 to 10% by weight, preferably 0.1 to 7% by weight (calculated as the corresponding element) based on the weight of the magnetic acicular iron-based alloy particles; and at least one selected from the group consisting of Ni, P, Si, Zn, Ti, Cu and B of usually 0.05 to 10% by weight, preferably 0.1 to 7% by weight (calculated as the corresponding element) based on the weight of the magnetic acicular iron-based alloy particles.

The iron content in the particles is the balance, and is preferably 50 to 99% by weight, more preferably 60 to 95% by weight (calculated as Fe) based on the weight of the magnetic acicular metal particles containing iron as a main component or the magnetic acicular iron-based alloy particles.

It is preferred that the shape of the magnetic particles is acicular, cubic or plate-like. The acicular shape may include not only needle-shape but also spindle-shape, rice ball-shape, or the like.

In the case that the shape of the magnetic particles is acicular, the magnetic particles used in the present invention have an average major as diameter of usually 0.01 to 0.50 μm, preferably 0.03 to 0.30 μm, an average minor axis diameter of usually 0.0007 to 0.17 μm, preferably 0.003 to 0.10 μm.

In the case that the shape of the magnetic particles is plate-like, the magnetic particles used in the present invention have an average particle size of usually 0.01 to 0.50 μm, preferably 0.03 to 0.30 μm, an average thickness of usually 0.0007 to 0.17 μm, preferably 0.003 to 0.10 μm.

The geometrical standard deviation of the major axis diameter of the magnetic particles used in the present invention is preferably not more than 2.5, more preferably 2.3. From the point of view of industrial productivity, the lower limit of the geometrical standard deviation of the major axis diameter is preferably 1.01.

The BET specific surface area of the magnetic particles used in the present invention is usually 35 to 100 m$^2$/g, preferably 38 to 90 m$^2$/g, more preferably 40 to 80 m$^2$/g.

In the case that the shape of the magnetic particles is acicular, the magnetic particles have an aspect ratio of usually not less than 3:1, preferably and not less than 5:1. The upper limit of the aspect ratio is usually 15:1, preferably 10:1 with the consideration of the dispersibility in the vehicle.

In the case that the shape of the magnetic particles is plate-like, the magnetic particles have a plate ratio (an average particle size/average thickness) of usually not less than 2:1, preferably and not less than 3:1. The upper limit of the plate ratio is usually 20:1, preferably 15:1 with the consideration of the dispersibility in the vehicle.

As to the magnetic properties of the magnetic particles used in the present invention, the coercive force is usually 19.9 to 318.3 kA/m (250 to 4000 Oe), and the saturation magnetization is usually 40 to 170 Am$^2$/kg (40 to 170 emu/g).

As to the magnetic properties of the magnetic iron oxide particles or Co-coated magnetic iron oxide particles used in the present invention, the coercive force is usually 19.9 to 135.3 kA/m (250 to 1700 Oe), preferably 23.9 to 135.3 kA/m (300 to 1700 Oe), and the saturation magnetization is usually 60 to 90 Am$^2$/kg (60 to 90 emu/g), preferably 65 to 90 Am$^2$/kg (65 to 90 emu/g).

As to the magnetic properties of the magnetic acicular metal particles containing iron as a main component or magnetic acicular iron-based alloy particles used in the present invention, the coercive force is usually 63.7 to 278.5 kA/m (800 to 3500 Oe), preferably 71.6 to 278.5 kA/m (900 to 3500 Oe), and the saturation magnetization is usually 90 to 170 Am$^2$/kg (90 to 170 emu/g) preferably 100 to 170 Am$^2$/kg (100 to 170 emu/g).

As to the magnetic properties of the magnetoplumbite-type ferrite particles used in the present invention, the coercive force is usually 39.8 to 318.3 kA/m (500 to 4000 Oe), preferably 51.7 to 318.3 kA/m (650 to 4000 Oe), and the saturation magnetization is usually 40 to 70 Am$^2$/kg (40 to 70 emu/g), preferably 45 to 70 Am$^2$/kg (45 to 70 emu/g).

As the binder resin for the magnetic recording layer, the same binder resin as that used for the production of the non-magnetic undercoat layer is usable.

The thickness or the magnetic recording layer obtained by applying the magnetic coating composition on the surface of the non-magnetic undercoat layer and dried, is usually in the range of 0.01 to 5.0 μm. The thickness is less than 0.01 μm, uniform coating may be difficult, so that unfavorable phenomenon such as unevenness on the coating surface is observed. On the other hand, when the thickness exceeds 5.0 μm, it may be difficult to obtain desired electromagnetic performance due to an influence of diamagnetism. The preferable thickness is in the range of 0.05 to 1.0 μm.

The mixing ratio of the magnetic acicular metal particles containing iron as a main component with the binder resin in the magnetic recording layer is usually 200 to 2000 parts by weight, preferably 300 to 1500 parts by weight based on 100 parts by weight of the binder resin.

A lubricant, a polishing agent, an antistatic agent, etc., which are generally used or the production of a magnetic recording medium may be added to the magnetic recording layer in an amount of usually 0.1 to 50 parts by weight based on 100 parts by weight of the binder resins.

The magnetic recording medium according to the present invention has the following properties.

The magnetic recording medium according to the present invention has a coercive force of usually 19.9 to 318.3 kA/m (250 to 4000 Oe); a squareness (residual magnetic flux density Br/saturation magnetic flux density Bm) of usually 0.85 to 0.95; a gloss (of the coating film) of usually 130 to 300%; a surface roughness Ra (of the coating film) of usually not more than 12.0 nm; a Young's modulus (relative value to a commercially available video tape: AV T-120 produced by Victor Company of Japan, Limited) of usually 122 to 160; a linear adsorption coefficient (of the coating film) of usually 1.90 to 10.0 μm$^{31\ 1}$; a surface resistivity of not more than 1×10$^9$ Ω/cm$^2$; and a friction coefficient of usually 0.05 to 0.30.

In case where the non-magnetic acicular black iron-based composite particles in which the organosilicon compound is formed on the surface of the acicular hematite particle or acicular iron oxide hydroxide particle, are used as non-magnetic magnetic particles, the magnetic recording medium according to the present invention has a coercive force of usually 19.9 to 318.3 kA/m (250 to 4000 Oe), preferably 23.9 to 318.3 kA/m (300 to 4000 Oe); a squareness (residual magnetic flux density Br/saturation magnetic flux density Bm) of usually 0.85 to 0.95, preferably 0.36 to 0.95; a gloss (of the coating film) of usually 130 to 300%, preferably 140 to 300%; a surface roughness Ra (of the coating film) of usually not more than 12.0 nm, preferably 2.0 to 11.0 nm, more preferably 2.0 to 10.0 nm; a Young's modulus (relative value to a commercially available video tape: AV T-120 produced by Victor Company of Japan, Limited) of usually 122 to 160, preferably 124 to 160; a linear adsorption coefficient (of the coating film) of usually 1.90 to 10.00 $\mu m^{-1}$, preferably 2.00 to 10.00 $\mu m^{-1}$; a surface resistivity of not more than $1 \times 10^9$ $\Omega/cm^2$, preferably not more than $7.5 \times 10$ $\Omega/cm^2$, more preferably not more than $5 \times 10^8$ $\Omega/cm^2$; and a friction coefficient of usually 0.05 to 0.30, preferably 0.05 to 0.28, more preferably 0.05 to 0.26.

In case where the non-magnetic acicular black iron-based composite particles in which the organosilicon compound is formed on the hydroxides and/or oxides of aluminum and/or silicon coat formed on the surface of the acicular hematite particle or acicular iron oxide hydroxide particle, are used as non-magnetic particles, the magnetic recording medium according to the present invention has a coercive force of usually 19.9 to 318.3 kA/m (250 to 4000 Oe), preferably 23.9 to 318.3 kA/m (300 to 4000 Oe); a squareness (residual magnetic flux density Br/saturation magnetic flux density Bm) of usually 0.85 to 0.95, preferably 0.86 to 0.95; a gloss (of the coating film) of usually 135 to 300%, preferably 145 to 300%; a surface roughness Ra (of the coating film) of usually not more than 11.5 nm, preferably 2.0 to 10.5 nm, more preferably 2.0 to 9.5 nm; a Young's modulus (relative value to a commercially available video tape: AV T-120 produced by Victor Company of Japan, Limited) of usually 124 to 160, preferably 126 to 160; a linear adsorption coefficient (of the coating film) of usually 1.90 to 10.00 $\mu m^{-1}$, preferably 2.00 to 10.00 $\mu m^{-1}$; a surface resistivity of not more than $1 \times 10^9$ $\Omega/cm^2$, preferably not more than $7.5 \times 10^8$ $\Omega/cm^2$, more preferably not more than $5 \times 10^8$ $\Omega/cm^2$; and a friction coefficient of usually 0.05 to 0.30, preferably 0.05 to 0.28, more preferably 0.05 to 0.26.

In case where magnetic acicular metal particles containing iron as a main component or magnetic acicular iron-based alloy particles are used as the magnetic particles, and the non-magnetic acicular black iron-based composite particles in which the organosilicon compound is formed on the surface of the acicular hematite particle or acicular iron oxide $cm^2$hydroxide particle, are used as non-magnetic particles, the magnetic recording medium according to the present invention has a coercive force of usually 63.7 to 278.5 kA/m (800 to 3500 Oe), preferably 71.6 to 278.5 kA/m (900 to 3500 Oe); a squareness (residual magnetic flux density Br/saturation magnetic flux density Bm) of usually 0.85 to 0.95, preferably 0.86 to 0.95; a gloss (of the coating film) of usually 185 to 300%, preferably 190 to 300%; a surface roughness Ra (of the coating film) of usually not more than 9.5 nm, preferably 2.0 to 9.0 nm, more preferably 2.0 to 8.5 nm; a Young's modulus (relative value to a commercially available video tape: AV T-120 produced by Victor Company of Japan, Limited) of usually 122 to 160, preferably 124 to 160; a linear adsorption coefficient (of the coating film) of usually 1.90 to 10.00 $\mu m^{-1}$, preferably 2.00 to 10.00 $\mu m^{-1}$; a surface resistivity of not more than $1 \times 10^9$ $\Omega/cm^2$, preferably not more than $7.5 \times 10^8$ $\Omega/cm^2$, more preferably not more than $5 \times 10^8$ $\Omega/cm^2$, and a friction coefficient of usually 0.05 to 0.30, preferably 0.05 to 0.28, more preferably 0.05 to 0.26.

In case where magnetic acicular metal particles containing iron as a main component or magnetic acicular iron-based alloy particles are used as the magnetic particles, and the non-magnetic acicular black iron-based composite particles in which the organosilicon compound is formed on the hydroxides and/or oxides of aluminum and/or silicon coat formed on the surface of the acicular hematite particle or acicular iron oxide hydroxide particle. are used as non-magnetic particles, the magnetic recording medium according to the present invention has a coercive force of usually 63.7 to 278.5 kA/m (800 to 3500 Oe), preferably 71.6 to 278.5 kA/m (900 to 3500 Oe); a squareness (residual magnetic flux density Br/saturation magnetic flux density Bm) of usually 0.85 to 0.95, preferably 0.86 to 0.95, a gloss (of the coating film) of usually 190 to 300%, preferably 195 to 300%; a surface roughness Ra (of the coating film) of usually not more than 9.0 nm, preferably 2.0 to 8.5 nm, more preferably 2.0 to 8.0 nm; a Young's modulus (relative value to a commercially available video tape; AV T-120 produced by Victor Company of Japan, Limited) of usually 124 to 160, preferably 126 to 160; a linear adsorption coefficient (of the coating film) of usually 1.90 to 10.00 $\mu m^{-1}$, preferably 2.00 to 10.00 $\mu m^{-1}$; a surface resistivity of not more than $1 \times 10^9$ $\Omega/cm^2$, preferably not more than $7.5 \times 10^8$ $\Omega/cm^2$, more preferably not more than $5 \times 10^8$ $\Omega/cm^2$; and a friction coefficient of usually 0.05 to 0.30, preferably 0.05 to 0.28, more preferably 0.05 to 0.26.

Next, the process for producing the non-magnetic acicular black iron-based composite particles according to the present invention, is described.

The acicular goethite particles as the core particles may be produced by a so-called wet process, i.e., by passing an oxygen-containing gas such as air through a suspension containing either ferrous hydroxide colloid, iron carbonate or iron-containing precipitates obtained by reacting a ferrous salt aqueous solution with alkali hydroxide, alkali carbonate or both of alkali hydroxide and alkali carbonate, and then after filtering-out and washing with water. The acicular hematite particles as the core particles may be produced by heat-treating the obtained acicular goethite particles at a temperature of 250 to 850° C. in an oxygen-containing gas such as air.

The acicular manganese-containing hematite particles as the core particles may be produced by heat-treating acicular goethite particles containing manganese in an amount of 8 to 150 atomic % based on whole Fe which are obtained by the below-mentioned method, at a temperature of 250 to 850° C. in an oxygen-containing gas such as air.

The acicular manganese-containing goethite particles as the core particles may be produced by conducting the above-mentioned wet process for producing the acicular goethite particles, in the presence of manganese, thereby forming acicular goethite particles containing manganese in an amount of 8 to 150 atomic % based on whole Fe.

Alternatively, elements other than Fe such as Ni, Zn, P and Si, which are generally added in order to enhance various properties of the particles such as the major axis diameter, the minor axis diameter and the aspect ratio, may be added during the reaction system for producing the acicular goethite particles.

Especially, in advance of the heat-dehydration of the acicular goethite particles for producing the acicular hematite particles, it is preferred that the surfaces of the acicular goethite particles are coated with sintering preventive, as is well known in the art. The coating treatment of the sintering preventive is composed of the steps of: adding the sintering preventive to an aqueous suspension containing the acicular goethite particles, mixing and stirring the resultant suspension, filtering out the particles, washing the particles with water, and drying the particles.

As the sintering preventive, known sintering preventives are usable. For example, phosphorus compounds such as sodium hexametaphosphate, polyphospholic acid and orthophosphoric acid, silicon compounds such as #3 water glass, sodium orthosilicate, sodium metasilicate and colloidal silica, boron compounds such as boric acid, aluminum compounds including aluminum salts such as aluminum acetate, aluminum sulfate, aluminum chloride and aluminum nitrate, alkali aluminate such as sodium aluminate, alumina sol and aluminum hydroxide, and titanium compounds such as titanyl sulfate may be exemplified, orthophosphoric acid, colloidal silica, boric acid and aluminum acetate are preferable.

The coating of the acicular hematite particles or the acicular iron oxide hydroxide particles with the alkoxysilane compounds, the polysiloxanes, the modified polysiloxanes or the terminal-modified polysiloxanes, may be conducted (i) by mechanically mixing and stirring the acicular hematite particles or the acicular iron oxide hydroxide particles together with the alkoxysilane compounds, the polysiloxanes, the modified polysiloxanes or the terminal-modified polysiloxanes; or (ii) by mechanically mixing and stirring both the components together while spraying the alkoxysilane compounds, the polysiloxanes, the modified polysiloxanes or the terminal-modified polysiloxanes onto the acicular hematite particles or the acicular iron oxide hydroxide particles. In these cases, substantially whole amount of the alkoxysilane compounds, the polysiloxanes, the modified polysiloxanes or the terminal-modified polysiloxanes added can be applied onto the surfaces of the acicular hematite particles or the acicular iron oxide hydroxide particles.

In addition, by conducting the above mixing or stirring treatment of the core particles together with the alkoxysilane compounds, at least a part of the alkoxysilane compounds coated on the core particles may be changed to the organosilane compounds.

In order to uniformly coat the surfaces of the acicular hematite particles or the acicular iron oxide hydroxide particles with the alkoxysilane compounds, the polysiloxanes, the modified polysiloxanes or the terminal-modified polysiloxanes, it is preferred that the acicular hematite particles or the acicular iron oxide hydroxide particles are preliminarily diaggregated by using a pulverizer.

As apparatuses used for (1) mixing and stirring the core particles with alkoxysilane compounds, the polysiloxanes, the modified polysiloxanes or the terminal-modified polysiloxanes; (2) mixing and stirring the carbon black fine particles with the particles surface-coated with alkoxysilane compounds, the polysiloxanes, the modified polysiloxanes or the terminal-modified polysiloxanes; (3) mixing and stirring the adhesive with the particles having a carbon black coat formed onto the surface-coating composed of alkoxysilane compounds, the polysiloxanes, the modified polysiloxanes or the terminal-modified polysiloxanes (hereinafter referred to as "composite particles"); and (4) mixing and stirring the carbon black fine particles with the composite particles coated with the adhesive, there may be preferably used apparatus capable of applying a shearing force to a layer or the particles to be treated, more preferably those capable of conducting shearing, spatula-stroking and compression at the same time, for example, wheel-type kneader, ball-type kneader, blade-type kneader, roll-type kneader or the like. Among these apparatuses, the wheel-type kneader is more effective for the practice of the present invention.

Specific examples of the wheel-type kneaders may include an edge runner (equal to a mix muller, a Simpson mill or a sand mill), a multi-mull, a Stotz mill, a wet pan mill, a Conner mill, a ring muller, or the like. Among them, an edge runner, a multi-mull, a Stotz mill, a wet pan mill and a ring muller are preferred, and an edge runner is more preferred.

Specific examples of the ball-type kneaders may include a vibrating mill or the like. Specific examples of the blade-type kneaders may include a Henschel mixer, a planetary mixer, a Nawter mixer or the like. Specific examples of the roll-type kneaders may include an extruder or the like.

In order to coat the surfaces of the core particles with the alkoxysilane compounds, the polysiloxanes, the modified polysiloxanes or the terminal-modified polysiloxanes as uniformly as possible, the conditions of the above mixing or stirring treatment may be appropriately controlled such that the linear load is usually 19.6 to 1960 N/cm (2 to 200 Kg/cm), preferably 98 to 1470 N/cm (10 to 150 Kg/cm), more preferably 147 to 980 N/cm (15 to 100 Kg/cm); and the treating time is usually 5 to 120 minutes, preferably 10 to 90 minutes. It is preferred to appropriately adjust the stirring speed in the range of usually 2 to 2,000 rpm, preferably 5 to 1,000 rpm, more preferably 10 to 800 rpm.

The amount of the alkoxysilane compounds, the polysiloxanes, the modified polysiloxanes or the terminal-modified polysiloxanes added, is preferably 0.15 to 45 parts by weight based on 100 parts by weight of the acicular hematite particles or the acicular iron oxide hydroxide particles.

When the amount of the alkoxysilane compounds, the polysiloxanes, the modified polysiloxanes or the terminal-modified polysiloxanes added is less than 0.15 part by weight, it may become difficult to form the carbon black coaton the coating layer. On the other hand, when the amount of the alkoxysilane compounds, the polysiloxanes, the modified polysiloxanes or the terminal-modified polysiloxanes added is more than 45 parts by weight, it is meaningless to add such unnecessarily large amount thereof because a sufficient amount of the carbon black coat can be formed on the surface of the coating layer. Next, the carbon black fine particles are added to the acicular hematite particles or the acicular iron oxide hydroxide particles coated with the alkoxysilane compounds, the polysiloxanes, the modified polysiloxanes or the terminal-modified polysiloxanes, and the resultant mixture is mixed and stirred to form a carbon black coat on at least a part of the coating layer composed of the alkoxysilane compounds, the polysiloxanes, the modified polysiloxanes or the terminal-modified polysiloxanes added.

As the carbon black fine particles used in the present invention, there may be exemplified commercially available carbon blacks such as furnace black, channel black or the like. Specific examples of the commercially available carbon blacks usable in the present invention, may include #3050, #3150, #3250, #3750, #3950, MA100, MA7, #1000, #2400B, #30, MA77, MA8, #650, MA11, #50, #52, #45, #2200B, MA600, etc. (tradename, produced by MITSUBISHI CHEMICAL CORP.), SEAST 9H, SEAST 7H, SEAST 6, SEAST 3H, SEAST 300, SEAST FM, etc. (tradename, produced by TOKAI CARBON CO., LTD.), Raven 1250, Raven 860 ULTRA, Raven 1000, Raven 1190 ULTRA, etc. (tradename, produced by COLOMBIAN CHEMICALS COMPANY), Ketchen black EC, Ketchen black EC600JD, etc. (tradename, produced by KETCHEN BLACK INTERNATIONAL CO., LTD.), BLACK PEARLS-L, BLACK PEARLS 1000, BLACX PEARLS 4630, VULCAN XC72, REGAL 660, REGAL 400, etc. (tradename, produced by CABOTT SPECIALTY CHEMICALS INK CO., LTD.), or the like.

In the consideration of the effect of reducing the myristic acid absorption, the use of carbon black having a pH value of not more than 8.0 is preferred. Specific examples of the commercially available carbon blacks usable in the present invention, may include #3050, ·3150, #3250, #3750, #3950, MA100, MA7, #1000, #2400B, #30, MA77, MA8, #650, MA11, #50, #52, #45, #2200B, MA600, etc. (tradename, produced by MITSUBISHI CHEMICAL CORP.), SEAST 9H, SEAST 7H, SEAST 6, SEAST 3H, SEAST 300, SEAST FM, etc. (tradename, produced by TOKAI CARBON CO., LTD.), Raven 1250, Raven 860 ULTRA, Raven 1000, Raven 1190 ULTRA. etc. (tradename, produced by COLOMBIAN CHEMICALS COMPANY), BLACK PEARLS-L, BLACK PEARLS 1000, REGAL 660, REGAL 400, etc. (tradename, produced by CABOTT SPECIALTY CHEMICALS INK CO., LTD.).

Further, in the consideration of uniform adhesion onto the organosilane compound coating layer, polysiloxane coating layer or dimethylpolysiloxane coating layer, the use of carbon black fine particles having a DBP oil absorption of not more than 180 ml/100 g is more preferred. Specific examples of the commercially available carbon blacks usable in the present invention, may include #3050, #3150, #3250, MA100, MA7, #1000, #2400B, #30, MA77, MA8, #650, MA11, #50, #52, #45, #2200B, MA600, etc. (tradename, produced by MITSUBISHI CHEMICAL CORP.), SEAST 9H, SEAST 7H, SEAST 6, SEAST 3H, SEAST 300, SEAST FM, etc. (tradename, produced by TOKAI CARBON CO., LTD.), Raven 1250, Raven 860 ULTRA, Raven 1000, Raven 1190 ULTRA, etc. (tradename, produced by COLOMBIAN CHEMICALS COMPANY), BLACK PEARLS-L, BLACK PEARLS 1000, REGAL 660, REGAL 400, etc. (tradename, produced by CABOTT SPECIALTY CHEMICALS INK CO., LTD.).

The average particle size of the carbon black fine particles used is usually 0.002 to 0.05 $\mu$m, preferably 0.002 to 0.035 $\mu$m. When the average particle size of the carbon black fine particles used is less than 0.002 $\mu$m, the carbon black fine particles used are too fine to be well handled.

On the other hand, when the average particle size thereof is more than 0.05 $\mu$m, since the particle size of the carbon black fine particles used is much larger, it is necessary to apply a larger mechanical shear force for forming the uniform carbon black coat on the coating layer composed of the organosilicon compounds, thereby rendering the coating process industrially disadvantageous.

The carbon black fine particles are added to the acicular hematite particles or the acicular iron oxide hydroxide particles coated with the alkoxysilane compounds, the polysiloxanes, the modified polysiloxanes or the terminal-modified polysiloxanes in an amount of 21 to 50 parts by weight based on 100 parts by weight of the acicular hematite particles or acicular iron oxide hydroxide particles, and the resultant mixture is mixed and stirred to form a carbon black coat (single carbon black coat) on at least a part of the coating layer composed of the alkoxysilane compounds, the polysiloxanes, the modified polysiloxanes or the terminal-modified polysiloxanes.

By varying an adding method of the carbon black fine particles, mixing and stirring conditions, it is possible to form the single carbon black coat on the coating layer composed of the organosilicon compounds, thereby rendering the coating process industrially disadvantageous.

As the adding method, a lump addition method, a continuous addition method, a divided addition method may be exemplified. When a large amount of the carbon black fine particles is added, it is preferred to conduct the continuous addition method and the divided addition method.

In case of continuously adding the carbon black fine particles, the carbon black fine particles may be added slowly and little by little, especially for a period of 5 minutes to 24 hours, preferably 5 minutes to 20 hours. The mixing and stirring step under the following conditions can be conducted.

In case of dividedly adding the carbon black fine particles, the adding step of the carbon black fine particles of 5 to 25 parts by weight based on 100 parts by weight of the acicular hematite particles or acicular iron oxide hydroxide particles. The mixing and stirring step under the following conditions can be repeated until the added amount of the carbon black fine particles reaches a predetermined amount thereof.

The mixing and stirring conditions may be appropriately selected so as to form a uniform carbon black coat on the coating layer composed of the organosilicon compounds, and may be controlled such that the linear load is usually 19.6 to 1,960 N/cm (2 to 200 kg/cm), preferably 98 to 1,470 N/cm (10 to 150 kg/cm), more preferably 147 to 980 N/cm (15 to 100 kg/cm); the treating time is usually 5 minutes to 24 hours, preferably 10 minutes to 20 hours; and the stirring speed is usually 2 to 2,000 rpm, preferably 5 to 1,000 rpm, more preferably 10 to 800 rpm.

After the carbon black coat is formed on the surface of the coating layer, the resultant composite particles may be dried or heat-treated, for example, at a temperature of usually 40 to 200° C., preferably 60 to 150° C. for usually 10 minutes to 12 hours, preferably 30 minutes to 3 hours.

The alkoxysilane used to coat the core particles in the thus obtained non-magnetic acicular black iron-based composite particles is finally converted into the organosilane compound through the above mixing and stirring step and drying or heat-treating step.

At least a part of the surface of the acicular hematite particles or the acicular iron oxide hydroxide particles may be coated with at least one compound selected from the group consisting of hydroxides of aluminum, oxides of aluminum, hydroxides of silicon and oxides of silicon, if required, in advance of mixing and stirring with the alkoxysilane compounds, the polysiloxanes, the modified polysiloxanes or the terminal-modified polysiloxanes.

The coat of the hydroxides and/or oxides of aluminum and/or silicon may be conducted by adding an aluminum compound, a silicon compound or both the compounds to a water suspension in which the acicular hematite particles or the acicular iron oxide hydroxide particles are dispersed, followed by mixing and stirring, and further adjusting the pH of the suspension, if required, thereby coating the surfaces of the acicular hematite particles or the acicular iron oxide hydroxide particles with at least one compound selected from the group consisting of hydroxides of aluminum, oxides of aluminum, hydroxides of silicon and oxides of silicon. The thus obtained particles coated with the hydroxides and/or oxides of aluminum and/or silicon are then filtered out, washed with water, dried and pulverized. Further, the particles coated with the hydroxides and/or oxides of aluminum and/or silicon may be subjected to post-treatments such as deaeration treatment and compaction treatment, if required.

As the aluminum compounds, there may be exemplified aluminum salts such as aluminum acetate, aluminum sulfate, aluminum chloride or aluminum nitrate, alkali aluminates such as sodium aluminate or the like.

The amount of the aluminum compound added is 0.01 to 50% by weight (calculated as Al) based on the weight of the acicular hematite particles or the acicular iron oxide hydroxide particles. When the amount of the aluminum compound added is less than 0.01% by weight, it may be difficult to sufficiently coat the surfaces of the acicular hematite particles or the acicular iron oxide hydroxide particles with hydroxides or oxides of aluminum, thereby failing to achieve the improvement of lessening the percentage of desorption of carbon black therefrom. On the other hand, when the amount of the aluminum compound added is more than 50% by weight, the coating effect is saturated and, therefore, it is meaningless to add such an excess amount of the aluminum compound.

As the silicon compounds, there may be exemplified #3 water glass, sodium orthosilicate, sodium metasilicate, colloidal silica or the like.

The amount of the silicon compound added is 0.01 to 50% by weight (calculated as $SiO_2$) based on the weight of the acicular hematite particles or the acicular iron oxide hydroxide particles. When the amount of the silicon compound added is less than 0.01% by weight, it may be difficult to sufficiently coat the surfaces of the acicular hematite particles or the acicular iron oxide hydroxide particles with hydroxides or oxides of silicon, thereby failing to achieve the improvement of lessening the percentage of desorption or carbon black therefrom. On the other hand, when the amount of the silicon compound added is more than 50% by weight, the coating effect is saturated and, therefore, it is meaningless to add such an excess amount of the silicon compound.

In the case where both the aluminum and silicon compounds are used in combination for the coating, the total amount of the aluminum and silicon compounds added is preferably 0.01 to 50% by weight (calculated as a sum of Al and $SiO_2$) based on the weight of the acicular hematite particles or the acicular iron oxide hydroxide particles.

The non-magnetic substrate according to the present invention is produced by applying a non-magnetic coating composition which contains the non-magnetic acicular black iron-based composite particles, a binder resin and a solvent, to the surface of the non-magnetic base film, followed by drying, thereby forming the non-magnetic undercoat.

As the solvents, there may be used methyl ethyl ketone, toluene, cyclohexanone, methyl isobutyl ketone, tetrahydrofuran, a mixture of these solvents or the like.

The total amount of the solvent used is 50 to 1,000 parts by weight based on 100 parts by weight of the non-magnetic acicular black iron-based composite particles. When the amount of the solvent used is less than 50 parts by weight, the viscosity of the non-magnetic coating composition prepared therefrom may become too high, thereby making it difficult to apply the non-magnetic coating composition. On the other hand, when the amount of the solvent used is more than 1,000 parts by weight, the amount of the solvent volatilized during the formation of the coating film may become too large, thereby rendering the coating process industrially disadvantageous.

The magnetic recording medium according to the present invention can be produced by applying a magnetic coating composition containing the magnetic particles, a binder resin and a solvent, on the non-magnetic undercoat layer, followed by drying, to form a magnetic recording layer thereon.

As the solvents, there may be used methyl ethyl ketone, toluene, cyclohexanone, methyl isobutyl ketone, tetrahydrofuran, a mixture of these solvents or the like.

The total amount of the solvent used is 65 to 1,000 parts by weight based on 100 parts by weight of the magnetic particles. When the amount of the solvent used is less than 65 parts by weight, the viscosity of the magnetic coating composition prepared therefrom becomes too high, thereby making it difficult to apply the magnetic coating composition. On the other hand, when the amount of the solvent used is more than 1,000 parts by weight, the amount of the solvent volatilized during the formation of the coating film becomes too large, thereby rendering the coating process industrially disadvantageous.

A point of the present invention lies in such a fact that in the case where the carbon black is strongly bonded onto the surface of each core particle in an amount as large as 21 to 50 parts by weight based on 100 parts by weight of the core particles, it is possible to obtain acicular black composite particles having a myristic acid absorption of 0.01 to 0.3 $mg/m^2$.

The reason why the myristic acid absorption of the non-magnetic magnetic acicular black iron-based composite particles according to the present invention can be reduced, is considered as follows, though not clearly known. That is, as shown in Comparative Examples hereunder, the myristic acid absorption of the non-magnetic particles cannot be reduced to not more than 0.3 $mg/m^2$ in any of the cases where the amount of the carbon black adhered is not less than 21 parts by weight and the carbon black desorption percentage is not less than 20%, and where the carbon black desorption percentage is less than 20% and the amount of the carbon black adhered is less than 21 parts by weight. Due to this fact, it is considered that by forming the dense carbon black coat having an appropriate uniform thickness on the surface of each core particle, it is possible to effectively inhibit bonding between many hydroxy groups existing on the surface of each core particle and carboxyl groups of myristic acid having a high affinity to the hydroxy groups.

The magnetic recording medium of the present invention which is produced by using the non-magnetic acicular black iron-based composite particles of the present invention as non-magnetic particles for non-magnetic undercoat layer thereof, exhibits a low friction coefficient.

The reason why the friction coefficient of the magnetic recording medium according to the present invention can be reduced, is considered as follows. That is, since the myristic acid absorption of the non-magnetic particles incorporated into the non-magnetic undercoat layer in a large amount, is limited to the specific range, an appropriately controlled amount of the myristic acid can be oozed onto the surface of the magnetic recording layer for a long period of time, thereby enabling the myristic acid to effectively exhibit its function as lubricant.

In accordance with the present invention, due to the fact that the non-magnetic acicular black iron-based composite particles as non-magnetic particles have an excellent dispersibility, and show an excellent blackness and a volume resistivity, and the myristic acid absorption of the non-magnetic acicular black iron-based composite particles is limited to the specific range, it s possible to produce the non-magnetic undercoat layer showing an excellent surface smoothness, an excellent blackness and a lower surface resistivity, and an appropriately controlled amount of the myristic acid can be oozed onto the surface of the magnetic recording layer. The non-magnetic acicular black iron-based composite particles according to the present invention are suitably used as non-magnetic particles contained in the non-magnetic undercoat layer of the magnetic recording medium suitable for high-density recording.

By using such non-magnetic acicular black iron-based composite particles used as non-magnetic particles contained in a non-magnetic undercoat layer, the magnetic recording medium according to the present invention shows an excellent surface smoothness, a lower light transmittance and a lower surface resistivity, and further has a low friction coefficient and an excellent running durability. The magnetic recording medium to the present invention is suitable for high-density recording.

EXAMPLES

The present invention is described in more detail by Examples and Comparative Examples, but the Examples are only illustrative and, therefore, not intended to limit the scope of the present invention.

Various properties were evaluated by the following methods.

(1) The average major axis diameter, average minor axis diameter and average particle size of acicular hematite particles, acicular iron oxide hydroxide particles, carbon black fine particles, non-magnetic acicular black iron-based composite particles and magnetic particles were respectively expressed by average values (measured in a predetermined direction) of about 350 particles which were sampled from a micrograph obtained by magnifying an original electron micrograph (×30,000) by four times in each of the longitudinal and transverse directions.

(2) The aspect ratio of the particles was expressed by a ratio of average major axis diameter to minor axis diameter thereof.

(3) The geometrical standard deviation of particle sizes was expressed by values obtained by the following method. That is, the particle sizes were measured from the above-magnified photograph. The actual particle sizes and the number of the particles were obtained from the calculation on the basis of the measured values. On a logarithmic normal probability paper, the particle sizes were plotted at regular intervals on the abscissa-axis and the accumulative number of particles belonging to each interval of the particle sizes were plotted by percentage on the ordinate-axis by a statistical technique. The particle sizes corresponding to the number of particles of 50% and 84.13%, respectively were read from the graph, and the geometrical standard deviation was measured from the following formula:

Geometrical standard deviation={particle size corresponding to 84.13% under integration sieve}/{particle size (geometrical average diameter) corresponding to 50% under integration sieve}

The more the geometrical standard deviation nears 1.0, the more excellent the particle size distribution of the particles.

(4) The specific surface area was expressed by values measured by a BET method.

(5) The amounts of Mn, Al and Si which were present within acicular hematite particles and acicular iron oxide hydroxide particles or on the surfaces thereof, the amount of Si contained in organosilicon compounds and the amount of Si contained in dimetylpolysiloxanes used for adhering the carbon black, were measured by a fluorescent X-ray spectroscopy device 3063M (manufactured by RIGAKU DENKI KOGYO CO., LTD.) according to JIS K0119 "General rule of fluorescent X-ray analysis".

(6) The amount of carbon black coat formed on the non-magnetic acicular black iron-based composite particles was measured by "Horiba Metal, Carbon and Sulfur Analyzer EMIA-2200 Model" (manufactured by HORIBA SEISAKUSHO CO., LTD.).

(7) The thickness or carbon black coat formed on the surfaces of the black iron-based composite particles is expressed by the value which was obtained by first measuring an average thickness of carbon black coat formed onto the surfaces of the particles on a photograph (×5,000,000) obtained by magnifying (ten times) a micrograph (×500,000) produced at an accelerating voltage of 200 kV using a transmission-type electron microscope (JEM-2010, manufactured by JAPAN ELECTRON Co., Ltd.), and then calculating an actual thickness of carbon black coat formed from the measured average thickness.

(8) The blackness of acicular hematite particles, acicular iron oxide hydroxide particles and non-magnetic acicular black iron-based composite particles, were measured by the following method. That is, 0.5 g of sample particles and 1.5 ml of castor oil were intimately kneaded together by a Hoover's muller to form a paste. 4.5 g of clear lacquer was added to the obtained paste and was intimately mixed to form a paint. The pain was applied on a cast-coated paper by using a 6-mil applicator to produce a coating film piece (having a film thickness of about 30 $\mu$m). The thus obtained coating film piece was measured according to JIS Z 8729 by a multi-light source spectrographic colorimeter MSC-IS-2D (manufactured by SUGA SHIKENKI CO., LTD.) to determine a L* value of colorimetric indices thereof.

Here, the L* value represents a lightness, and the smaller the L* value, the more excellent the blackness.

(9) The volume resistivity or the acicular hematite particles, the acicular iron oxide hydroxide particles and the non-magnetic acicular black iron-based composite particles were measured as follows. First, 0.5 g of the respective particles were weighed, and pressure-molded into a cylindrical shape at $1.372 \times 10^7$ Pa (140 Kg/cm$^2$) using a KBr tablet machine (manufactured by SIMAZU SEISAKUSHO CO., LTD.), thereby producing a cylindrical sample to be measured.

The thus-produced sample was then exposed to an atmosphere kept at a temperature of 25° C. and a relative humidity of 60%, for not less than 12 hours. Thereafter, the sample was fixed between stainless steel electrodes, and a voltage of 15V was applied to the sample using a Wheatstone bridge (TYPE2768, manufactured by YOKOGAWA-HOKUSHIN DENKI Co., LTD.), thereby measuring a resistance value R ($\Omega$) of the sample.

Next, an upper surface area A (cm$^2$) and a thickness $t_0$ (cm) of the cylindrical sample were measured, and the respective measured values were substituted for A and $t_0$ of the following formula to obtain the volume resistivity ($\Omega \cdot$cm) of the sample.

$$\text{Volume resistivity } (\Omega \cdot \text{cm}) = R \times (A/t_0)$$

(10) The myristic acid absorption was measured by the following method. The lower the myristic acid absorption, the more the fatty acid becomes to ooze on the surface of the magnetic recording layer and the lower the friction coefficient thereof.

100 g of 1.5 mm$\phi$ glass beads, 9 g of particles to be measured and 45 ml of a tetrahydrofuran solution containing myristic acid in an amount enough to form one layer thereof on each particle, were charged into a 140-ml glass bottle, and then mixed and dispersed together for 60 minutes using a paint shaker.

Next, the thus obtained dispersion was taken out, charged into a 50-ml precipitation tube and centrifuged at 10,000 rpm for 15 minutes, thereby separating a solvent portion from a solid portion. The amount (concentration) of myristic acid contained in the solvent portion was determined by a gravimetric method. By subtracting the measured value from an amount of myristic acid initially charged, the amount of myristic acid contained in the solid portion was obtained as a myristic acid absorption (mg/m$^2$) of the particles to be measured.

(11) The desorption percentage (%) of carbon black desorbed from the non-magnetic acicular black iron-based composite particles was measured by the following method.

That is, 3 g of the non-magnetic acicular black iron-based composite particles and 40 ml of ethanol were placed in a 50-ml precipitation pipe and then was subjected to ultrasonic dispersion for 20 minutes. Thereafter, the obtained dispersion was allowed to stand for 120 minutes, and separated the carbon black desorbed from the non-magnetic acicular black iron-based composite particles on the basis of the difference in specific gravity therebetween. Next, the thus separated non-magnetic acicular black iron-based composite particles were mixed again with 40 ml of ethanol, and the obtained mixture was further subjected to ultrasonic dispersion for 20 minutes. Thereafter, the obtained dispersion was allowed to stand for 120 minutes, thereby separating the non-magnetic acicular black iron-based composite particles and carbon black desorbed, from each other. The thus separated non-magnetic acicular black iron-based composite particles were dried at 100° C. for one hour, and then the carbon content thereof was measured by the "Horiba Metal, Carbon and Sulfur Analyzer EMIA-2200 Model" (manufactured by HORIBA SEISAKUSHO CO., LTD.). The desorption percentage (%) was calculated according to the following formula:

$$\text{Desorption percentage (\%)} = \{(W_a - W_e)/W_a\} \times 100$$

wherein $W_a$ represents an amount of carbon black initially adhered on the non-magnetic acicular black iron-based composite particles; and $W_e$ represents an amount of carbon black which still remains on the non-magnetic acicular black iron-based composite particles after the above desorption test.

The closer to zero the desorption percentage (%), the smaller the amount of carbon black desorbed from the non-magnetic acicular black iron-based composite particles.

(12) The viscosity of the coating composition was obtained by measuring the viscosity of the coating composition at 25° C. at a shear rate D of 1.92 sec$^{-1}$ by using "E type viscometer EMD-R" (manufactured by TOKYO KEIKI, CO., LTD.).

(13) The gloss of the surface of the coating film of each of the non-magnetic undercoat layer and the magnetic recording layer was measured at an angle of incidence of 45° by "glossmeter UGV-5D" (manufactured by SUGA SHIKENKI, CO., LTD.).

(14) The surface roughness Ra is expressed by the centerline average roughness of the surface of the coating film by using "Surfcom-575A" (manufactured by TOKYO SEIMITSU CO., LTD.).

(15) The strength of the coating film was expressed the Young's modulus obtained by "Autograph" (produced by SHIMAZU SEISAKUSHO Co., Ltd.). The Young's modulus was expressed by the ratio of the Young's modulus of the coating film to that of a commercially available video tape "AV T-120" (produce by VICTOR COMPANY OF JAPAN, LIMITED). The higher the relative value, the more the strength of the coating film is favorable.

(16) The magnetic properties of the magnetic particles and magnetic recording medium were measured under an external magnetic field of 795.8 kA/m (10 kOe) by "Vibration Sample Magnetometer VSM-3S-15 (manufactured by TOEI KOGYO, CO., LTD.)".

(17) The light transmittance is expressed by the linear adsorption coefficient measured by using "UV-Vis Recording Spectrophotometer UV-2100" (manufactured by SHIMAZU SEISAKUSHO, Co. Ltd.). The linear adsorption coefficient is defined by the following formula, and the larger the value, the more the transmittance of light become difficult:

Linear adsorption coefficient ($\mu m^{31\ 1}$)=$\{1 \text{ n } (1/t)\}/FT$ wherein t represents a light transmittance (–) at $\lambda$=900 nm, and FT represents thickness ($\mu m$) of the coating composition of the film used for the measurement.

As a blank for measuring the linear adsorption coefficient, in case of the non-magnetic substrate composed of the base film and the non-magnetic undercoat layer, the same non-magnetic base film was used, and in case of the magnetic recording medium composed of the base film, the non-magnetic undercoat layer and the magnetic recording layer, the same non-magnetic base film was used.

(18) The surface resistivity value of a coating film was measured as follows. The coating film to be measured was exposed to an atmosphere kept at a temperature of 25° C. and a relative humidity of 60%, for not less than 12 hours. Thereafter, the coating film was slit into 6 mm width, and then placed on metal electrodes each having a width of 6.5 mm such that a coating surface thereof was contacted with the metal electrodes. Two 170-gram weights were fitted to opposite ends of the coating film so as to bring the coating film into close contact with the metal electrodes. Then, a D.C. voltage of 500V was applied between the metal electrodes, thereby measuring a surface resistivity value of the coating film.

(19) The friction coefficient of the magnetic recording medium is expressed by the value obtained from the ratio of a friction force measured between the surface of magnetic tape and metal surface (aluminum mirror surface) using a tensile tester "TENSILON" (manufactured by SHIMADZU SEISAKUSHO Co., Ltd.), to a load applied.

(20) The thickness of each of the base film, the non-magnetic undercoat layer and the magnetic recording layer constituting the magnetic recording medium was measured in the following manner by using "Digital Electronic Micrometer R351C" (manufactured by ANRITSU CORP.)

The thickness (A) of a base film was first measured. Similarly, the thickness (B) (B=the sum of the thicknesses of the base film and the non-magnetic undercoat layer) of a non-magnetic substrate obtained by forming a non-magnetic undercoat layer on the base film was measured. Furthermore, the thickness (C) (C=the sum of the thicknesses of the base film, the non-magnetic undercoat layer and the magnetic recording layer) of a magnetic recording medium obtained by forming a magnetic recording layer on the non-magnetic substrate was measured. The thickness of the non-magnetic undercoat layer is expressed by (B)–(A), and the thickness of the magnetic recording layer is expressed by (C)–(B).

Example 1

<Production of Non-magnetic Acicular Black Iron-based Composite Particles>

20 kg of acicular hematite particles (average major axis diameter: 0.143 $\mu m$; average minor axis diameter: 0.0210 $\mu m$; aspect ratio: 6.8:1; geometrical standard deviation of major axis diameter: 1.38; BET specific surface area value: 55.3 m$^2$/g; blackness (L* value): 28.3; volume resistivity: 2.3×10$^8$ Ω·cm and myristic acid absorption: 0.41 mg/m$^2$), were diaggregated in 150 liters of pure water using a stirrer, and further passed through a TK pipeline homomixer (manufactured by TOKUSHU KIKA KOGYO CO., LTD.) three times, to obtain a slurry containing the acicular hematite particles.

Successively, the obtained slurry was passed through a transverse-type sand grinder (tradename "MIGHTY MILL MHG-1.5 L", manufactured by INOUE SEISAKUSHO Co, LTD.) five times at an axis-rotating speed of 2,000 rpm, thereby obtaining a slurry in which the acicular hematite particles were dispersed.

The acicular hematite particles in the obtained slurry, which remain on a sieve of 325 meshes (mesh size: 44 μm) was 0%. The slurry was filtered and washed with water, thereby obtaining a wet cake composed of the acicular manganese-containing hematite particles. The obtained wet cake composed of the acicular hematite particles was dried at 120° C. 11.0 kg or the dried particles were then charged into an edge runner "MPUV-2 Model" (tradename, manufactured by MATSUMOTO CHUZO TEKKOSHO CO., LTD.), and mixed and stirred at 294 N/cm (30 Kg/cm) for 30 minutes, thereby lightly diaggregating the particles.

220 g of methyltriethoxysilane (tradename: "TSL8123", produced by GE TOSHIBA SILICONE CO., LTD.) (2.0 parts by weight based on 100 parts by weight of the acicular hematite particles), was mixed and diluted with 200 ml of ethanol to obtain a solution of methyltriethoxysilane. The methyltriethoxysilane solution was added to the thus diaggregated acicular hematite particles while operating the edge runner. The acicular hematite particles were continuously mixed and stirred at a linear load of 588 N/cm (60 Kg/cm) and a stirring speed of 22 rpm or 30 minutes.

Next, carbon black fine particles D (particle shape: granular shape; average particle size: 0.022 μm; geometrical standard deviation of particle sizes: 1.78; BET specific surface area value: 133.5 m²/g; blackness (L* value) 14.6; pH value: 3.4; and DBP oil absorption: 84 ml/100 g) of 25.0 parts by weight based on 100 parts by weight of the acicular hematite particles, were added to the acicular hematite particles coated with methyltriethoxysilane for 150 minutes while operating the edge runner. Further, the particles were continuously mixed and stirred at a linear load of 588 N/cm (60 Kg/cm) and a stirring speed of 22 rpm for 30 minutes to form a carbon black coat on the coating layer composed of methyltriethoxysilane, thereby obtaining composite particles.

In order to determine the coating amount of methyltriethoxysilane and the amount of carbon black adhered, a part of the thus obtained composite particles was sampled, and heat-treated at 105° C. for 60 minutes using a drier. As a result, it was confirmed that the coating amount of methyltriethoxysilane was 0.29% by weight (calculated as Si) (equivalent to 2.0 parts by weight based on 100 parts by weight of the acicular hematite particles), and the amount of carbon black adhered was 19.92% by weight (equivalent to 25 parts by weight based on 100 parts by weight of the acicular hematite particles). Further, as a result of the observation of electron micrograph, it was confirmed that almost a whole amount of carbon black added was adhered onto the coating layer of an organosilane compound produced from the methyltriethoxysilane.

The obtained non-magnetic acicular black iron-based composite particles had an average major axis diameter of 0.145 μm, an average minor axis diameter of 0.0212 μm and an aspect ratio of 6.8:1 as shown in the electron photograph. In addition, the non-magnetic acicular black iron-based composite particles showed a geometrical standard deviation of major axis diameter of 1.38, a BET specific surface area value of 56.3 m²/g, a blackness (L* value) of 17.8, a volume resistivity of $6.2 \times 10^1$ Ω·cm, myristic acid absorption of 0.21 mg/m², and a desorption percentage of carbon black of 6.6%. The thickness of the carbon black coat formed was 0.0026 μm. Since no carbon black were recognized on the electron photograph, it was confirmed that a whole amount of the carbon black used contributed to the formation of the carbon black coat.

Example 2
<Production of Non-magnetic Substrate: Formation of Non-magnetic Undercoat Layer on Base Film>

12 g of the non-magnetic acicular black iron-based composite particles obtained in Example 1 were mixed with a binder resin solution (30% by weight of vinyl chloride-vinyl acetate copolymer resin having a sodium sulfonate group and 70% by weight of cyclohexanone) and cyclohexanone, and each of the obtained mixtures (solid content: 72% by weight) was kneaded by a plast-mill for 30 minutes.

Each of the thus-obtained kneaded material was charged into a 140 ml-glass bottle together with 95 g of 1.5 mmϕ glass beads, a binder resin solution (30% by weight of polyurethane resin having a sodium sulfonate group and 70% by weight of a solvent (methyl ethyl ketone: toluene= 1:1)), cyclohexanone, methyl ethyl ketone and toluene, and the obtained mixture was mixed and dispersed by a paint shaker for 6 hours. Thereafter, the lubricant was added to the resultant mixture, and the obtained mixture was mixed and dispersed by a paint shaker for 15 minutes to obtain a non-magnetic coating composition.

The thus-obtained non-magnetic coating composition containing the non-magnetic acicular black iron-based composite particles was as follows:

| | |
|---|---|
| Non-magnetic acicular black iron-based composite particles | 100 parts by weight |
| Vinyl chloride-vinyl acetate copolymer resin having a sodium sulfonate group | 10 parts by weight |
| Polyurethane resin having a sodium sulfonate group | 10 parts by weight |
| Lubricant (myristic acid: butyl stearate = 1:2) | 2.0 parts by weight |
| Cyclohexanone | 56.9 parts by weight |
| Methylethyl ketone | 142.3 parts by weight |
| Toluene | 85.4 parts by weight |

The viscosity of the obtained non-magnetic coating composition was 374 cP.

The non-magnetic coating composition obtained was applied to a polyethylene terephthalate film of 12 μm thick to a thickness of 55 μm by an applicator, and the coating film was then dried, thereby forming a non-magnetic undercoat layer. The thickness of the non-magnetic undercoat layer was 3.5 μm.

The thus obtained non-magnetic undercoat layer had a gloss of 196%, and a surface roughness Ra of 6.6 nm. The Young's modulus (relative value) thereof was 123. The linear adsorption coefficient (of the coating film) thereof was 3.44 $\mu m^{31\ 1}$; and the surface resistivity thereof was $4.3 \times 10^6$ Ω/cm².

Example 3
<Production of Magnetic Recording Medium: Formation of Magnetic Recording Layer>

12 g of magnetic acicular metal particles containing iron as a main component (average major axis diameter: 0.131 μm, average minor axis diameter: 0.0180 μm, aspect ratio: 7.3:1, BET specific surface area value: 58.0 m²/g, geometrical standard deviation of major axis diameter: 1.40, coercive force: 156.9 kA/m (1972 Oe), saturation magnetization: 135.0 Am²/kg (135.0 emu/g), Al content: 2.56% by weight and Co content: 5.85% by weight), 1.2 g of a polishing agent (AKP-50: trade name, produced by SUMITOMO CHEMICAL CO., LTD.), 0.12 g of carbon black (#3250B, trade name, produced by MITSUBISHI CHEMICAL CORP.), a binder resin solution (30% by weight of vinyl chloride-vinyl acetate copolymer resin having a sodium sulfonate group and 70% by weight of cyclohexanone) and cyclohexanone were mixed to obtain a mixture (solid content 78% by weight). The mixture was further kneaded by a plast-mill for 30 minutes to obtain a kneaded material.

The thus-obtained kneaded material was charged into a 140 ml-glass bottle together with 95 g of 1.5 mm$\phi$ glass beads, a binder resin solution (30% by weight of polyurethane resin having a sodium sulfonate group and 70% by weight of a solvent (methyl ethyl ketone: toluene 1:1)), cyclohexanone, methyl ethyl ketone and toluene, and the mixture was mixed and dispersed by a paint shaker for 6 hours. Then, the lubricant and hardening agent were added to the mixture, and the resultant mixture was mixed and dispersed by a paint shaker for 15 minutes.

The thus-obtained magnetic coating composition was as follows:

| | |
|---|---|
| Magnetic acicular metal particles containing iron as a main component | 100 parts by weight |
| Vinyl chloride-vinyl acetate copolymer resin having a sodium sulfonate group | 10 parts by weight |
| Polyurethane resin having a sodium sulfonate group | 10 parts by weight |
| Polishing agent (AKP-30) | 10 parts by weight |
| Carbon black (#3250B) | 1.0 parts by weight |
| Lubricant (myristic acid: butyl stearate = 1:2) | 3.0 parts by weight |
| Hardening agent (polyisocyanate) | 5.0 parts by weight |
| Cyclohexanone | 65.8 parts by weight |
| Methyl ethyl ketone | 164.5 parts by weight |
| Toluene | 98.7 parts by weight |

The viscosity of the obtained magnetic coating composition was 7,680 cP.

The magnetic coating composition obtained was applied to the non-magnetic undercoat layer obtained in Example 1 to a thickness of 15 $\mu$m by an applicator, and the magnetic recording medium obtained was oriented and dried in a magnetic field, and then calendered. The magnetic recording medium was then subjected to a curing reaction at 60° C. for 24 hours, and thereafter slit into a width of 1.27 cm (0.5 inch), thereby obtaining a magnetic tape. The thickness of the respective magnetic recording layer was 1.0 $\mu$m.

The coercive force of the magnetic tape produced by forming a magnetic recording layer on the non-magnetic undercoat layer was 155.7 kA/m (1956 Oe), the squareness (Br/Bm) thereof was 0.87, the gloss thereof was 212%, the surface roughness Ra thereof was 6.0 nm, the Young's modulus (relative value) thereof was 127, the linear absorption coefficient thereof was 3.86 $\mu m^{31\ 1}$, the surface resistivity thereof was $4.1\times10^5$ $\Omega/cm^2$, and the friction coefficient thereof was 0.21.

Core Particles 2

The same procedure as defined in Example 1 was conducted by using 20 kg of the diaggregated acicular hematite particles (core particles 1) and 150 liters of water, thereby obtaining a slurry containing the acicular hematite particles. The pH value of the obtained re-dispersed slurry containing the acicular hematite particles was adjusted to 10.5 by using sodium hydroxide, and then the concentration of the solid content in the slurry was adjusted to 98 g/liter by adding water thereto. After 150 liters of the slurry was heated to 60° C., 5444 ml of a 1.0 mol/liter $NaAlO_2$ solution (corresponding to 1.0% by weight (calculated as Al) based on the weight of the acicular hematite particles) was added to the slurry. After allowing the obtained slurry to stand for 30 minutes, the pH value of the slurry was adjusted to 7.5 by using acetic acid. After further allowing the resultant slurry to stand for 30 minutes, the slurry was subjected to filtration, washing with water, drying and pulverization, thereby obtaining the acicular hematite particles whose surface was coated with hydroxides of aluminum, (average major axis diameter: 0.144 $\mu$m; average minor axis diameter: 0.0211 $\mu$m; aspect ratio: 6.8:1; geometrical standard deviation of major axis diameter: 1.38; BET specific surface area value: 55.1 $m^2$/g; blackness (L* value): 28.5; volume resistivity: $4.8\times10^8$ $\Omega\cdot$cm and myristic acid absorption: 0.47 mg/$m^2$). The amount of aluminum compound coated on the hematite particles is 0.98% by weight (calculated as Al) based on the weight of the hematite particles.

Examples 4

The same procedure as defined in Example 1 was conducted except for varying kinds of core particles, kinds and amounts of polysiloxane added, edge runner treatment conditions used in the polysiloxane-coating step, kinds and amounts of the carbon black fine particles added, and edge runner treatment conditions used in the process for forming the carbon black coat, thereby obtaining non-magnetic acicular black iron-based composite particles.

Meanwhile, carbon black fine particles were added in three lots in which the amount of each lot thereof was 10.0 parts by weight based on 100 parts by weight of the core particles.

As a result of the observation by an electron microscope, carbon black were not recognized in the non-magnetic acicular black iron-based composite particles obtained. Therefore, it was confirmed that a substantially whole amount of the used carbon black contributed to the formation of the carbon black coat on the coating layer composed of an organosilane compound produced from the polysiloxane.

Various properties of the carbon black fine particles B and D used, are shown in Table 4. The main production conditions are shown in Table 5, and various properties of the obtained non-magnetic acicular black iron-based composite particles are shown in Table 6.

Meanwhile, "TSF484" (tradename, produced by GE TOSHIBA SILICONE Co., Ltd.) was methyl hydrogen polysiloxane.

Example 5

<Production of Non-magnetic substrate: Formation of Non-magnetic Undercoat layer on Non-magnetic Base Film>

By using the non-magnetic acicular black iron-based composite particles obtained in Example 4, non-magnetic undercoat layers were formed in the same way as in Example 2.

The main producing conditions and various properties are shown in Table 7.

Examples 6
<Production of Magnetic Recording Medium: Formation of Magnetic Coating Film>

Magnetic recording media were produced in the same way as in Example 3 except for varying the kind of non-magnetic undercoat layer and the kind of magnetic particles.

Various properties of the magnetic particles (1) used, are shown in Table 11.

The main producing conditions and various properties are shown in Table 8.

TABLE 1

| Core particles | Properties of acicular hematite particles or acicular iron oxide hydroxide particles | |
| --- | --- | --- |
| | Kind | Particle shape |
| Core particles 1 | Hematite particles | Acicular |

| | Average major axial diameter (μm) | Average minor axial diameter (μm) | Aspect ratio (–) | Geometrical standard deviation value (–) |
| --- | --- | --- | --- | --- |
| Core particles 1 | 0.143 | 0.0210 | 6.8:1 | 1.38 |

| | BET specific surface area (m²/g) | Mn content (wt. %) | Volume resistivity value (Ω · cm) |
| --- | --- | --- | --- |
| Core particles 1 | 55.3 | — | $2.3 \times 10^8$ |

| | Blackness (L* value) (–) | Myristic acid absorption (mg/m²) |
| --- | --- | --- |
| Core particles 1 | 28.3 | 0.41 |

TABLE 2

| Core particles | Kind of core particles | Surface-treatment step Additives | | |
| --- | --- | --- | --- | --- |
| | | Kind | Calculated as | Amount (wt. %) |
| Core particles 2 | Core particles 1 | Sodium aluminate | Al | 1.0 |

| Core particles | Surface-treatment step Coating material | | |
| --- | --- | --- | --- |
| | Kind | Calculated as | Amount (wt. %) |
| Core particles 2 | A | Al | 0.98 |

TABLE 3

| Core particles | Properties of surface-treated core particles | | | |
| --- | --- | --- | --- | --- |
| | Average major axial diameter (μm) | Average minor axial diameter (μm) | Aspect ratio (–) | Geometrical standard deviation value (–) |
| Core particles 2 | 0.144 | 0.0211 | 6.8:1 | 1.38 |

| | BET specific surface area (m²/g) | Mn content (wt. %) | Volume resistivity value (Ω · cm) |
| --- | --- | --- | --- |
| Core particles 2 | 55.1 | — | $4.8 \times 10^8$ |

| | Blackness (L* value) (–) | Myristic acid absorption (mg/m²) |
| --- | --- | --- |
| Core particles 2 | 28.5 | 0.47 |

TABLE 4

| Kind of carbon black fine particles | Properties of carbon black fine particles | | |
| --- | --- | --- | --- |
| | Particle shape | Average particle size (μm) | Geometrical standard deviation value (–) |
| Carbon black B | Granular | 0.022 | 1.78 |
| Carbon black D | Granular | 0.030 | 2.06 |

| | BET specific surface area (m²/g) | pH value (–) |
| --- | --- | --- |
| Carbon black B | 133.3 | 3.4 |
| Carbon black D | 84.6 | 8.0 |

| | DBP oil absorption (ml/100 g) | Blackness (L* value) (–) |
| --- | --- | --- |
| Carbon black B | 84 | 14.6 |
| Carbon black D | 95 | 17.0 |

TABLE 5

| | Production of non-magnetic acicular black iron-based composite particles Coating with alkoxysilane or polysiloxane Additives | | |
| --- | --- | --- | --- |
| Examples | Kind of core particles | Kind | Amount added (part by weight) |
| Example 1 | Core particles 1 | Methyl triethoxysilane | 2.0 |
| Example 4 | Core particles 6 | TSF484 | 1.0 |

| | Production of non-magnetic acicular black iron-based composite particles Coating with alkoxysilane or polysiloxane | | | |
| --- | --- | --- | --- | --- |
| | Edge runner treatment | | | Coating amount (calculated as Si) |
| | Linear load | | Time | |
| Examples | (N/cm) | (Kg/cm) | (min.) | (wt. %) |
| Example 1 | 588 | 60 | 30 | 0.29 |
| Example 4 | 588 | 60 | 30 | 0.44 |

TABLE 5-continued

Production of non-magnetic acicular black iron-based composite particles
Adhesion step with carbon black coat

| Examples | Carbon black Kind | Amount adhered (part by weight) |
|---|---|---|
| Example 1 | D | 25.0 |
| Example 4 | B | 30.0 |

Production of non-magnetic acicular black iron-based composite particles
Adhesion step with carbon black coat

| Examples | Edge runner treatment Linear load (N/cm) | Edge runner treatment (Kg/cm) | Time (min.) | Amount adhered (calculated as C) (wt. %) |
|---|---|---|---|---|
| Example 1 | 588 | 60 | 30 | 19.92 |
| Example 4 | 588 | 60 | 30 | 22.96 |

TABLE 6

Properties of non-magnetic acicular black iron-based composite particles

| Examples | Average major axial diameter ($\mu$m) | Average minor axial diameter ($\mu$m) | Aspect ratio (-) | Geometrical standard deviation value (-) |
|---|---|---|---|---|
| Example 1 | 0.145 | 0.0212 | 6.8:1 | 1.38 |
| Example 4 | 0.145 | 0.0213 | 6.8:1 | 1.38 |

| Examples | BET specific surface area (m$^2$/g) | Volume resistivity value ($\Omega \cdot$ cm) |
|---|---|---|
| Example 1 | 56.3 | 6.2 × 10$^1$ |
| Example 4 | 55.9 | 4.4 × 10$^1$ |

| Examples | Black-ness (L* value) (-) | Myristic acid absorption (mg/m$^2$) | Carbon black desorption percentage (%) |
|---|---|---|---|
| Example 1 | 17.8 | 0.21 | 6.6 |
| Example 4 | 18.3 | 0.20 | 6.1 |

TABLE 7

| Examples | Production of non-magnetic coating composition Kind of non-magnetic particles | Production of non-magnetic coating composition Weight ratio of particles to resin (-) | Properties of non-magnetic coating composition Viscosity (cP) |
|---|---|---|---|
| Example 2 | Example 52 | 5.0 | 374 |
| Example 5 | Example 53 | 5.0 | 415 |

TABLE 7-continued

Properties of non-magnetic undercoat layer

| Examples | Thickness ($\mu$m) | Gloss (%) | Surface roughness Ra (nm) | Young's modulus (relative value) |
|---|---|---|---|---|
| Example 2 | 3.5 | 196 | 6.6 | 123 |
| Example 5 | 3.4 | 195 | 6.4 | 124 |

Properties of non-magnetic undercoat layer

| Examples | Linear absorption ($\mu$m$^{-1}$) | Surface resistivity value ($\Omega$/cm$^2$) |
|---|---|---|
| Example 2 | 3.44 | 43 × 10$^6$ |
| Example 5 | 3.27 | 1.2 × 10$^6$ |

TABLE 8

Production of magnetic recording medium

| Examples | Kind of non-magnetic undercoat layer | Kind of magnetic particles | Weight ratio of particles to resin (-) |
|---|---|---|---|
| Example 3 | Example 54 | Particles obtained in Example 3 | 5.0 |
| Example 6 | Example 55 | Magnetic particles (1) | 5.0 |

Properties of magnetic recording medium

| Examples | Thickness of magnetic layer ($\mu$m) | Coercive force value (kA/m) | Coercive force value (Oe) | Squareness Br/Bm (-) | Gloss (%) |
|---|---|---|---|---|---|
| Example 3 | 1.0 | 155.7 | 1.956 | 0.87 | 212 |
| Example 6 | 1.0 | 165.8 | 2.083 | 0.87 | 214 |

Properties of magnetic recording medium

| Examples | Surface roughness Ra (nm) | Young's modulus (relative value) | Linear absorption ($\mu$m$^{-1}$) |
|---|---|---|---|
| Example 3 | 6.0 | 127 | 3.86 |
| Example 6 | 5.9 | 127 | 3.89 |

Properties of magnetic recording medium

| Examples | Friction coefficient ($\mu$m$^{-1}$) | Surface resistivity value ($\Omega$/cm$^2$) |
|---|---|---|
| Example 3 | 0.21 | 4.1 × 10$^5$ |
| Example 6 | 0.20 | 2.8 × 10$^5$ |

What is claimed is:

1. A magnetic recording medium comprising:

a non-magnetic base film;

a non-magnetic undercoat layer formed on said non-magnetic base film, comprising a binder resin myristic acid, butyl stearate and non-magnetic acicular black iron-based composite particles; and a magnetic coating film formed on said non-magnetic undercoat layer, comprising a binder resin and magnetic particles, said non-magnetic acicular black iron-based composite particles having an average major axis diameter of about 0.011 to 0.35 μm, comprising:

acicular hematite particles or acicular iron oxide hydroxide particles;

a coating layer formed on the surface of said acicular hematite particle or acicular iron oxide hydroxide particle, comprising at least one organosilicon compound selected from the group consisting of:

(1) organosilane compounds obtained from an alkoxysilane compounds, and (2) polysiloxanes or modified polysiloxanes; and a single carbon black coat formed on at least a part of said coating layer comprising said organosilicon compound, in an amount of 21 to 50 parts by weight based on 100 parts by weight of said acicular hematite particles or acicular iron oxide hydroxide particles.

2. A magnetic recording medium according to claim 1, wherein said acicular hematite particles or acicular iron oxide hydroxide particles are particles having a coat formed on at least a part of the surface of said acicular hematite particles or acicular iron oxide hydroxide particles and comprising at least one compound selected from the group consisting of hydroxides of aluminum, oxides of aluminum, hydroxides of silicon and oxides of silicon in an amount of 0.01 to 50% by weight, calculated as Al or $SiO_2$, based on the total weight of the acicular hematite particles or acicular iron oxide hydroxide particles.

3. A magnetic recording medium according to claim 2, which further comprises a gloss of coating film of 135 to 300%, a surface roughness Ra of coating film of not more than 11.5 nm, a linear absorption of coating film of 1.90 to 10.00 μm$^{-1}$, a surface resistivity of not more than 1 □10$^9$ Ω/cm$^2$, and a coefficient of friction of 0.05 to 0.30.

4. A magnetic recording medium according to claim 1, wherein said modified polysiloxanes are ones selected from the group consisting of:

(A) polysiloxanes modified with at least one compound selected from the group consisting of polyethers, polyesters and epoxy compounds, and (B) polysiloxanes whose molecular terminal is modified with at least one group selected from the group consisting of carboxylic acid groups, alcohol groups and a hydroxyl group.

5. A magnetic recording medium according to claim 4, wherein said polysiloxanes modified with at least one compound selected from the group consisting of polyethers, polyesters and epoxy compounds are represented by the general formula (III), (IV) or (V):

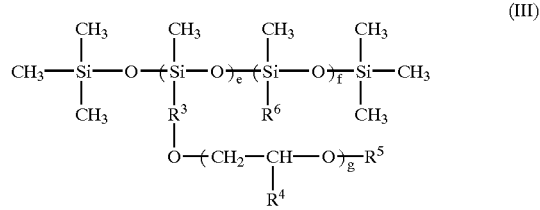
(III)

wherein $R^3$ is —(—CH$_2$—)$_h$—; $R^4$ is —(—CH$_2$—)$_i$—CH$_3$; $R^5$ is —OH, —COOH, —CH=CH$_2$, —C(CH$_3$)=CH$_2$ or —(—CH$_2$—)$_j$—CH$_3$; $R^6$ is —(—CH$_2$—)$_k$—CH$_3$; g and h are an integer of 1 to 15; i,j and k are an integer of 0 to 15; e is an integer of 1 to 50; and f is an integer of 1 to 300;

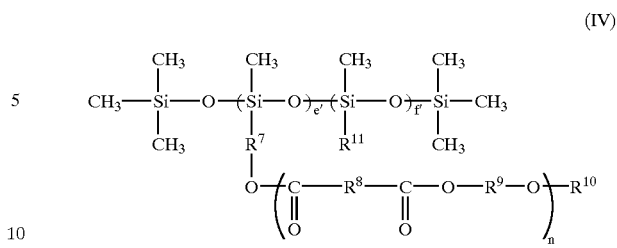
(IV)

wherein $R^7$, $R^8$ and $R^9$ are —(—CH$_2$—)$_q$— and may be the same or different; $R^{10}$ is —OH, —COOH, —CH=CH$_2$, —C(CH$_3$)=CH$_2$ or —(—CH$_2$—)$_r$—CH$_3$; $R^{11}$ is —(—CH$_2$—)$_s$—CH$_3$; n and q are an integer of 1 to 15; r and s are an integer of 0 to 15; e' is an integer of 1 to 50; and f' is an integer of 1 to 300; or

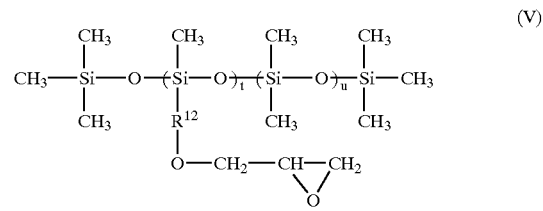
(V)

wherein $R^{12}$ is —(—CH$_2$—)$_v$—; v is an integer of 1 to 15; t is an integer of 1 to 50; and u is an integer of 1 to 300.

6. A magnetic recording medium according to claim 4, wherein said polysiloxanes whose molecular terminal is modified with at least one group selected from the group consisting of carboxylic acid groups, alcohol groups and a hydroxyl group are represented by the general formula (VI):

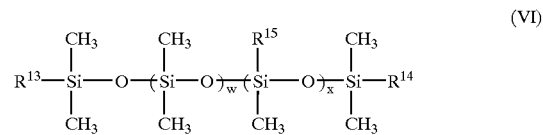
(VI)

wherein $R^{13}$ and $R^{14}$ are —OH, $R^{16}$OH or $R^{17}$COOH and may be the same or different; $R^{15}$ is —CH$_3$ or —C$_6$H$_5$; $R^{16}$ and $R^{17}$ are —(—CH$_2$—)$_y$—; y is an integer of 1 to 15; w is an integer of 1 to 200; and x is an integer of 0 to 100.

7. A magnetic recording medium according to claim 1, wherein said alkoxysilane compound is represented by the general formula (I):

(I)

wherein $R^1$ is C$_6$H$_5$—, (CH$_3$)$_2$CHCH$_2$— or n-C$_b$H$_{2b+}$— (wherein b is an integer of 1 to 18); X is CH$_3$O— or C$_2$H$_5$O—; and a is an integer of 0 to 3.

8. A magnetic recording medium according to claim 7, wherein said alkoxysilane compound is methyltriethoxysilane, dimethyldiethoxysilane, phenyltriethoxysilane, diphenyldiethoxysilane, methyltrimethoxysilane, dimethyldimethoxysilane, phenyltrimethoxysilane, diphenyldimethoxysilane, isobutyltrimethoxysilane or decyltrimethoxysilane.

9. A magnetic recording medium according to claim 1, wherein said polysiloxanes are represented by the general formula (II):

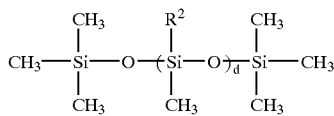

(II)

wherein $R^2$ is H— or particle, particle-, and d is an integer of 15 to 450.

10. A magnetic recording medium according to claim 9, wherein said polysiloxanes are ones having methyl hydrogen siloxane units.

11. A magnetic recording medium according to claim 1, wherein said acicular hematite particles are acicular manganese-containing hematite particles.

12. A magnetic recording medium according to claim 1, wherein said acicular iron oxide hydroxide particles are acicular manganese-containing goethite particles.

13. A magnetic recording medium according to claim 1, wherein the amount of said coating organosilicon compounds is 0.02 to 5.0% by weight, calculated as Si, based on the total weight of the organosilicon compounds and said acicular hematite particles or acicular iron oxide hydroxide particles.

14. A magnetic recording medium according to claim 1, wherein the thickness of said carbon black coat is not more than 0.06 μm.

15. A magnetic recording medium according to claim 1, wherein said non-magnetic acicular black iron-based composite particles have an absorption amount of tic acid of 0.01 to 0.3 mg/m$^2$.

16. A magnetic recording medium according to claim 1, said non-magnetic acicular black iron-based composite particles have an average minor axis diameter of 0.006 to 0.18 μm, an aspect ratio of 2:1 to 20:1, a BET specific surface area of 35 to 300 m$^2$/g, a geometrical standard deviation value of the average major axis diameter of not more than 1.50.

17. A magnetic recording medium according to claim 1, which further comprises a gloss of coating film of 130 to 300%, a surface roughness Ra of coating film of not more than 12.0 nm, a linear absorption of coating film of 1.90 to 10.00 μm$^{-1}$, a surface resistivity of not more than $1 \times 10^9$ Ω/cm$^2$, and a coefficient of friction of 0.05 to 0.30.

18. A non-magnetic substrate comprising:
a non-magnetic base film; and
a non-magnetic undercoat layer formed on said non-magnetic base film, comprising a binder resin, myristic acid, butyl stearate and non-magnetic acicular black iron-based composite particles having an average major axis diameter of about 0.011 to 0.35 μm, comprising:
acicular hematite particles or acicular iron oxide hydroxide particles;
a coating layer formed on the surface of said acicular hematite particle or acicular iron oxide hydroxide particle, comprising at least one organosilicon compound selected from the group consisting of:
(1) organosilane compounds obtained from an alkoxysilane compounds, and
(2) polysiloxanes or modified polysiloxanes; and
a single carbon black coat formed on at least a part of the coating layer comprising the organosilicon compound coated, in an amount of 21 to 50 parts by weight based on 100 parts by weight of the acicular hematite particles or acicular iron oxide hydroxide particles.

19. A non-magnetic substrate according to claim 18, wherein said acicular hematite particles or acicular iron oxide hydroxide particles are particles having a coat formed on at least a part of the surface of said acicular hematite particles or acicular iron oxide hydroxide particles and comprising at least one compound selected from the group consisting of hydroxides of aluminum, oxides of aluminum, hydroxides of silicon and oxides of silicon in an amount of 0.01 to 50% by weight, calculated as Al or SiO$_2$, based on the total weight of the acicular hematite particles or acicular iron oxide hydroxide particles.

20. A non-magnetic substrate according to claim 19, which further comprises a gloss of coating film of 175 to 280%, a surface roughness Ra of coating film of 2.0 to 11.5 nm, a linear absorption of coating film of 1.50 to 5.00 μm$^{-1}$, and a surface resistivity of $1 \times 10^3$ to $1 \times 10^{11}$ Ω/cm$^2$.

21. A non-magnetic substrate according to claim 18, which further comprises a gloss of coating film of 170 to 280%, a surface roughness Ra of coating film of 2.0 to 12.0 nm, a linear absorption of coating film of 1.50 to 5.00 μm$^{-1}$, and a surface resistivity of $1 \times 10^3$ to $1 \times 10^{11}$ Ω/cm$^2$.

* * * * *